(12) United States Patent
Carlson et al.

(10) Patent No.: US 11,780,181 B2
(45) Date of Patent: Oct. 10, 2023

(54) MULTI-LANE TOWS FOR USE WITH PLY-BY-PLY FORMING MACHINES

(71) Applicant: The Boeing Company, Chicago, IL (US)

(72) Inventors: Lisa Christina Carlson, Auburn, WA (US); Garrett Charles Hanson, Everett, WA (US); Darrell D. Jones, Mill Creek, WA (US); Silas Lawton Studley, Lake Forest Park, WA (US); Daniel R. Smith, Woodinville, WA (US); Paul Chace Wilcoxson, Kent, WA (US); Scott Krajca, Seattle, WA (US)

(73) Assignee: The Boeing Company, Chicago, IL (US)

( * ) Notice: Subject to any disclaimer, the term of this patent is extended or adjusted under 35 U.S.C. 154(b) by 34 days.

(21) Appl. No.: 17/454,272

(22) Filed: Nov. 10, 2021

(65) Prior Publication Data

US 2022/0152949 A1 May 19, 2022

Related U.S. Application Data

(60) Provisional application No. 63/115,035, filed on Nov. 18, 2020.

(51) Int. Cl.
*B29C 70/38* (2006.01)
*B64F 5/10* (2017.01)
(Continued)

(52) U.S. Cl.
CPC .......... *B29C 70/388* (2013.01); *B29C 70/545* (2013.01); *B29D 99/0014* (2013.01);
(Continued)

(58) Field of Classification Search
CPC ... B29C 70/388; B29C 70/386; B29C 70/384; B29C 70/382; B29C 70/38;
(Continued)

(56) References Cited

U.S. PATENT DOCUMENTS

| | | | | |
|---|---|---|---|---|
| 5,110,395 | A | * | 5/1992 | Vaniglia ............. B29C 53/8016 156/425 |
| 2004/0026025 | A1 | * | 2/2004 | Sana ..................... B29C 70/545 156/523 |

(Continued)

FOREIGN PATENT DOCUMENTS

| | | |
|---|---|---|
| EP | 2998228 A1 | 3/2016 |
| EP | 3112137 A1 | 1/2017 |

(Continued)

OTHER PUBLICATIONS

European Patent Office Extended Search Report, dated Sep. 12, 2022 regarding EP Application No. 21207531.1; 12 pages.

(Continued)

*Primary Examiner* — George R Koch
(74) *Attorney, Agent, or Firm* — Yee & Associates, P.C.

(57) ABSTRACT

A method includes dispensing a first set of lanes, that each comprise a tow of fiber-reinforced material, at a first angle such that the lanes are placed side-by-side with respect to each other, forming a first layer of a multi-lane tow. The method further includes applying a film directly in contact with multi-lane tow that resists shear forces applied to the multi-lane tow, transporting the multi-lane tow to a mandrel, and compacting the multi-lane tow via a Ply-By-Ply (PBP) machine disposed at the mandrel. The method further comprises removing the film from the multi-lane tow.

20 Claims, 34 Drawing Sheets

(51) Int. Cl.
*B64C 3/18* (2006.01)
*B29D 99/00* (2010.01)
*B29C 70/54* (2006.01)
*B29L 31/30* (2006.01)
*B29L 31/00* (2006.01)

(52) U.S. Cl.
CPC ............... *B64C 3/182* (2013.01); *B64F 5/10* (2017.01); *B29L 2031/001* (2013.01); *B29L 2031/3085* (2013.01)

(58) Field of Classification Search
CPC ... B29C 70/545; B32B 41/00; B29D 99/0014; B64C 3/182; B64F 5/10
See application file for complete search history.

(56) References Cited

U.S. PATENT DOCUMENTS

| | | | |
|---|---|---|---|
| 2005/0178083 A1 | 8/2005 | Fournie et al. | |
| 2006/0162143 A1* | 7/2006 | Nelson | B29C 70/207 29/430 |
| 2007/0175171 A1 | 8/2007 | Delgado et al. | |
| 2010/0170613 A1 | 7/2010 | Kendall et al. | |
| 2014/0060732 A1* | 3/2014 | Shair | B29C 65/78 156/289 |
| 2014/0065354 A1 | 3/2014 | Smith, Jr. et al. | |
| 2018/0147778 A1 | 5/2018 | Parkinson et al. | |

FOREIGN PATENT DOCUMENTS

| | | |
|---|---|---|
| EP | 3461625 A1 | 4/2019 |
| WO | 2014175799 A1 | 10/2014 |

OTHER PUBLICATIONS

European Patent Office Replacement Search Report, dated Oct. 7, 2022 regarding EP Application No. 21207531.1; 16 pages.
Netherlands Patent Office Written Opinion and Search Report with English Translation, dated Jun. 18, 2021 regarding Application No. NL2027406; 10 pages.
Netherlands Patent Office Written Opinion and Search Report with English Translation, dated Jul. 2, 2021 regarding Application No. NL2027407; 13 pages.
"Glossary of Terms", Composites, ASM International, vol. 21, Dec. 2001, 13 pages.
Extended European Search Report dated Apr. 19, 2022 regarding EP Application No. 21207531.1; 12 pages.
Extended European Search Report dated Apr. 22, 2022 regarding EP Application No. 21207500.6; 5 pages.

* cited by examiner

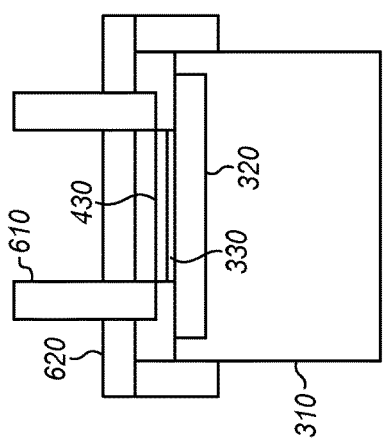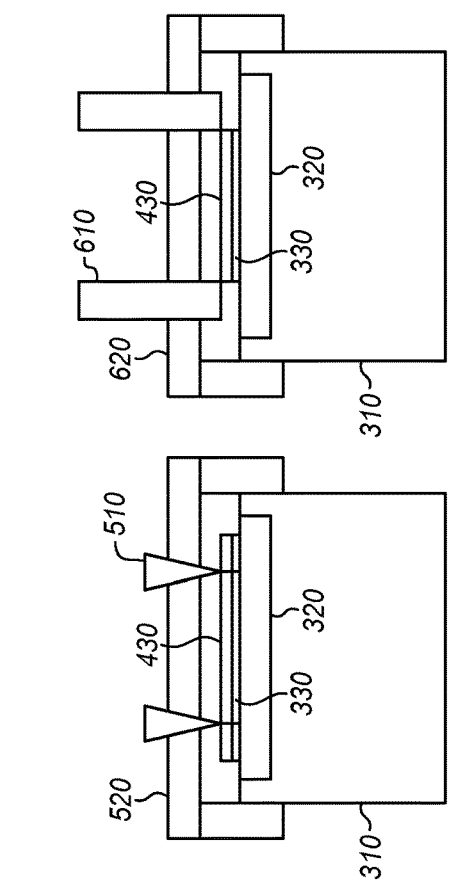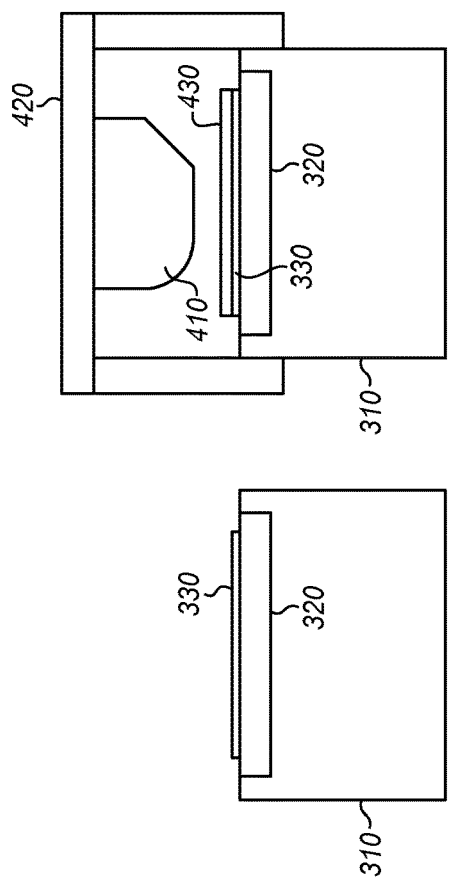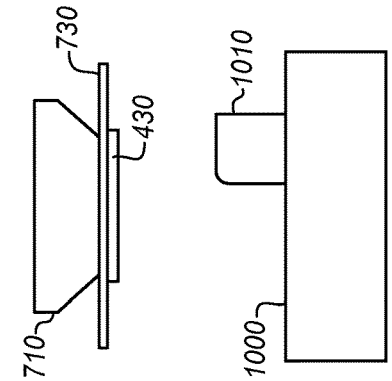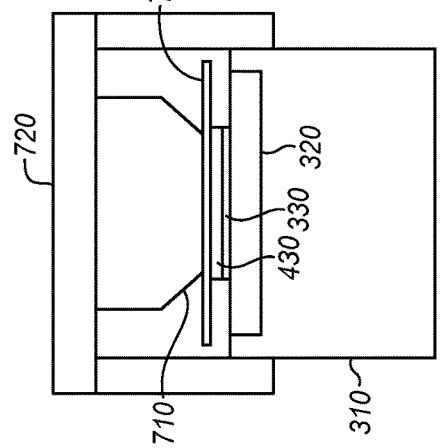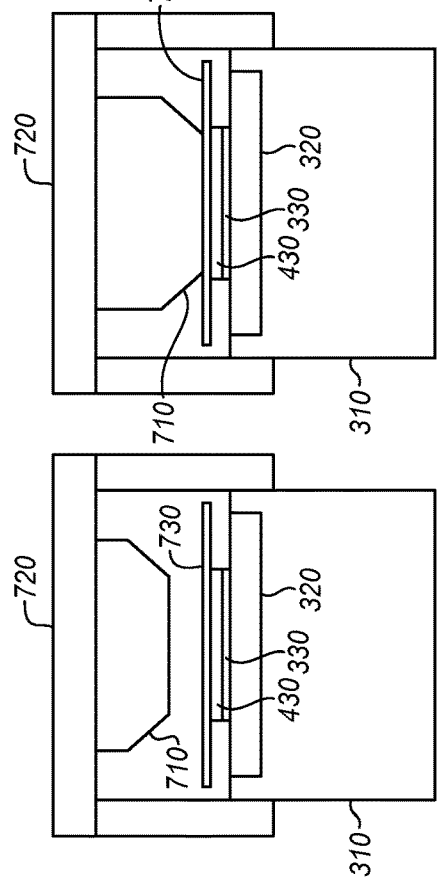

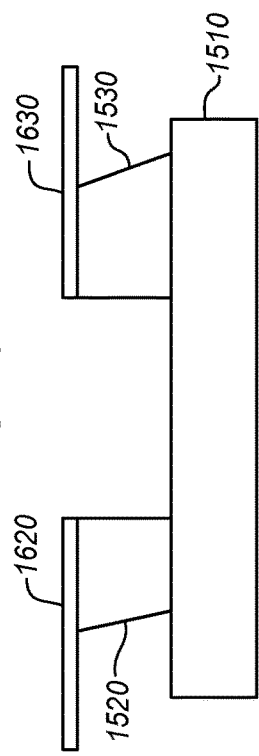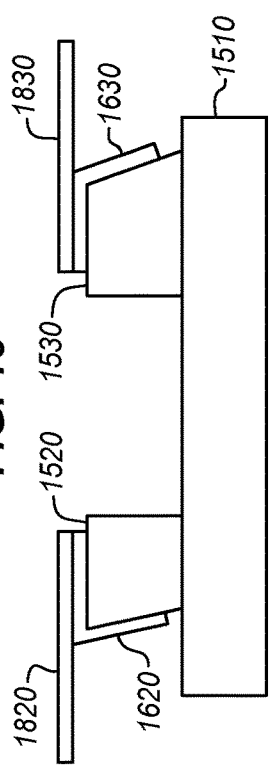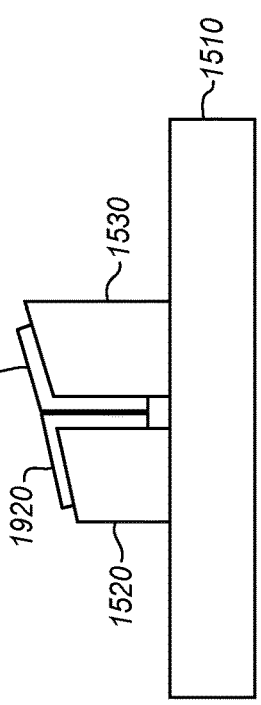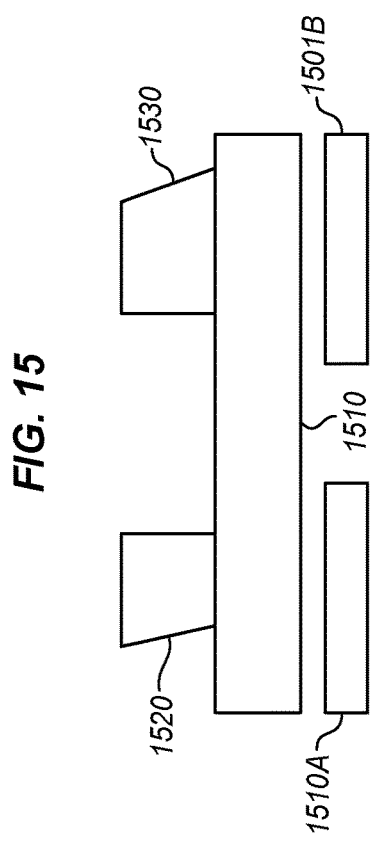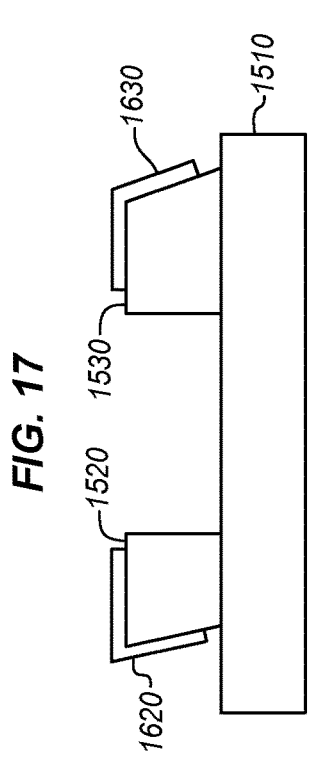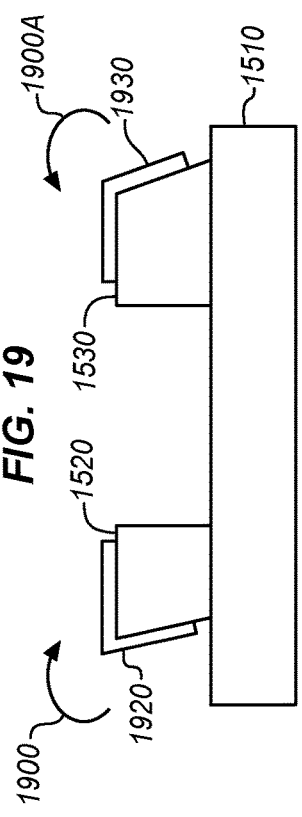

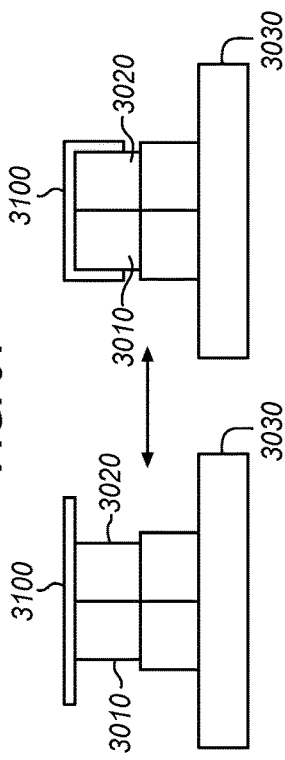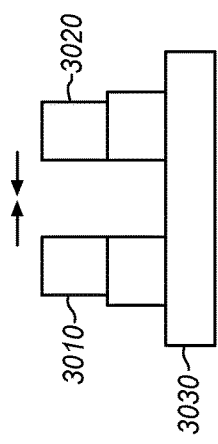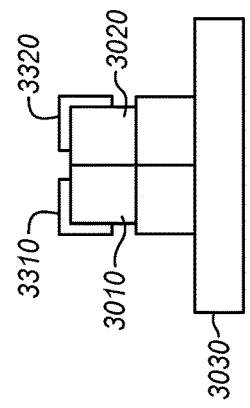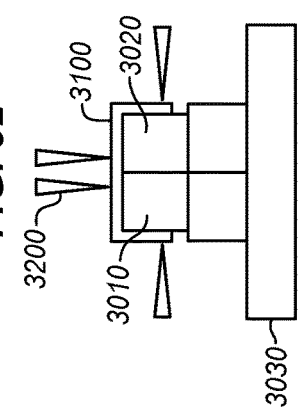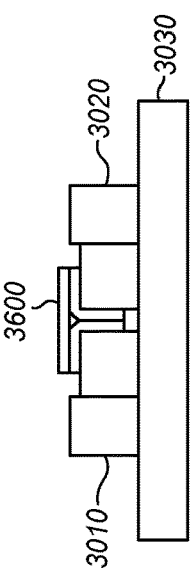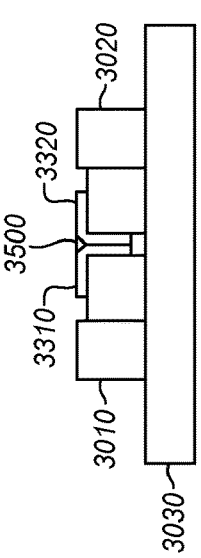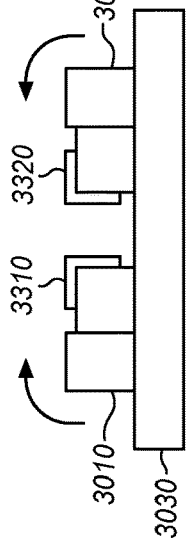

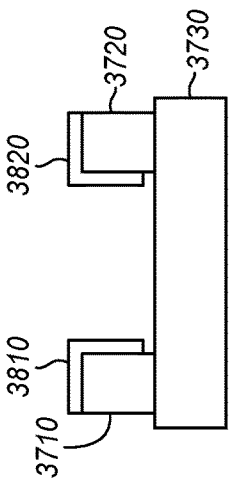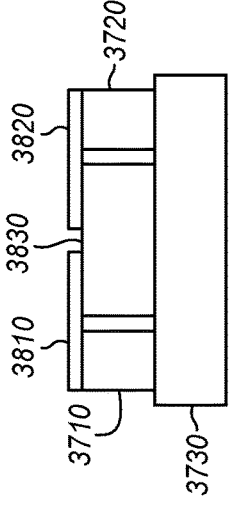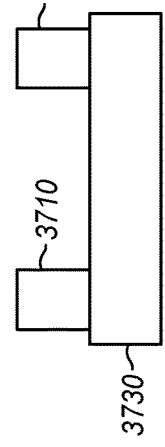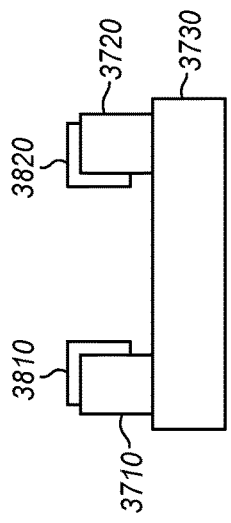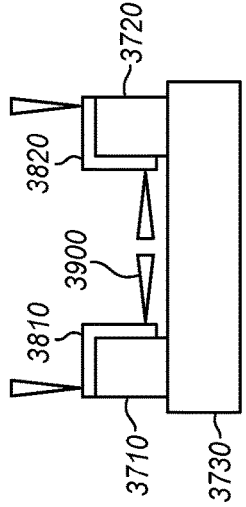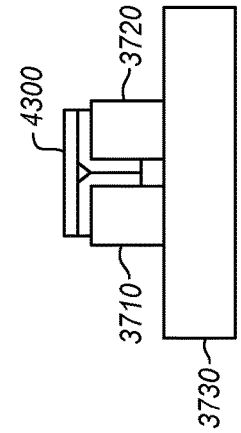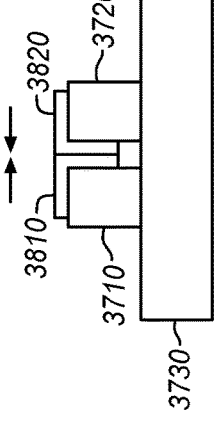

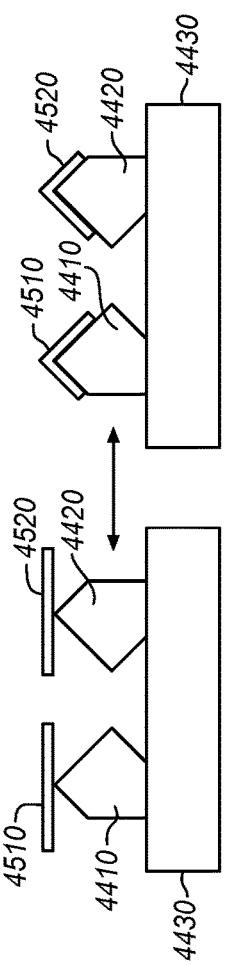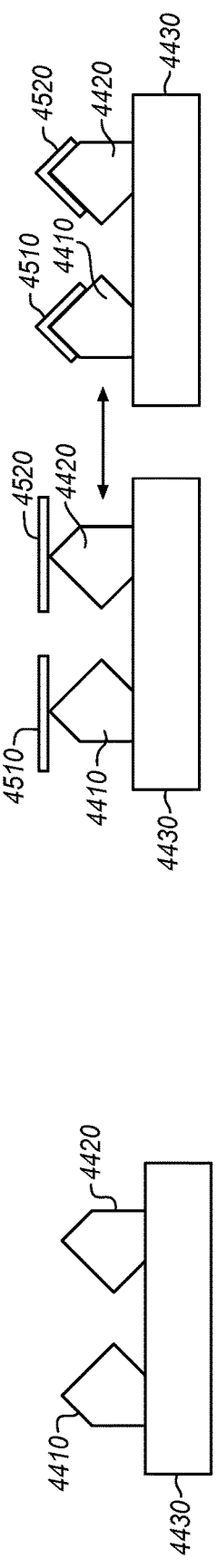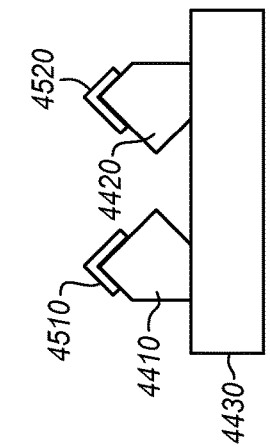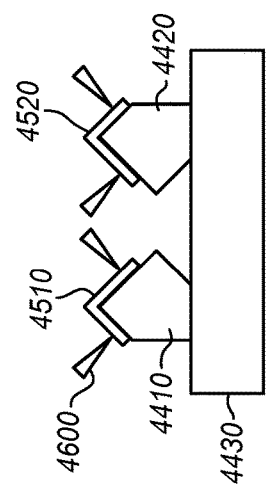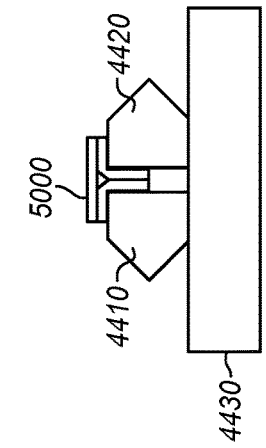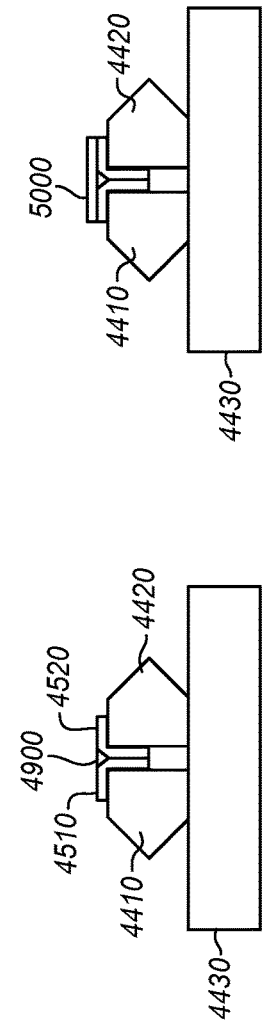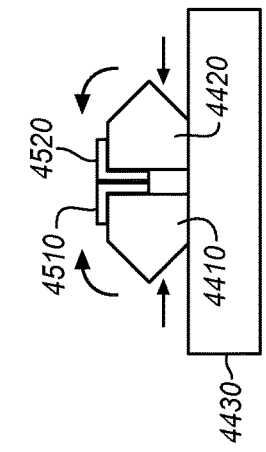

MULTI-LANE TOWS FOR USE WITH PLY-BY-PLY FORMING MACHINES

CROSS-REFERENCE TO RELATED APPLICATION

This application claims the benefit of U.S. Provisional Patent Application Ser. No. 63/115,035 filed Nov. 18, 2020, and entitled "Multi-Lane Tows for Use with Ply-by-Ply Forming Machines" which is incorporated herein by reference in its entirety.

FIELD

The disclosure relates to the field of fabrication, and in particular, to fabrication using composite materials.

BACKGROUND

Ply-by-Ply (PBP) forming machines (also known as "single ply forming machines") apply forces that compact unhardened plies (uncured or unconsolidated) of composite material onto mandrels in order to fabricate preforms for composite parts. Compaction ensures that a ply is made physically integral with the underlying preform, and also ensures that the preform conforms with desired standards for shape and size before it is hardened (e.g., cured or consolidated) into a composite part.

Plies used by PBP forming machines may be cut from broadgood sheets of continuous fiber-reinforced material. Cutting plies from a broadgood sheet results in an undesirable amount of material in each broadgood sheet being wasted. This issue is particularly notable in the aerospace industry because thermoset materials are particularly expensive to purchase, store, and maintain. Furthermore, complex contours for composite parts, such as those found in the aerospace industry, may further increase the amount of waste.

Another issue related to PBP forming techniques is that during compaction, PBP forming machines apply shearing forces that press a ply into shape. The shearing forces have the potential to undesirably stretch or distort the ply, depending on the orientation of fibers within the ply. If distorting or stretching occurs beyond a predetermined tolerance, the entire preform may be discarded or reworked. Furthermore, because fiber orientation is dictated by design constraints, it is not desirable to alter fiber orientations of plies to address this fabrication concern.

A still further issue with PBP forming is that it is particularly slow. PBP forming requires a great deal of labor in support of ply kitting, ply sorting and transfer, placing plies on a carrier or forming mandrel, and performing film removal. This causes PBP forming to be particularly expensive as a fabrication technique for composite parts, which is undesirable. For example, current methods of cutting material from broadgoods, and the lack of efficient techniques of fabricating plies and transferring them to a preform or forming mandrel, require substantial human interaction.

In addition, during fabrication, a wing panel of an aircraft may be assembled at one cell, and then may be transported to a new cell where stringers are installed onto the wing panel. While the fabrication processes discussed above are reliable, they encounter delays when work at a specific portion of a wing panel is completed more slowly than expected. For example, if a particular aspect of stringer preform placement upon a wing panel takes longer than expected, then the wing panel cannot progress to a next cell until the work is completed. Alternatively, placement of a stringer preform may be completed after the wing panel has progressed to the next cell, but this out of position work requires specialized tooling to be moved into place and operated in order to perform placement of the missing stringer. This work necessarily obstructs some or all of the work planned for the next cell. Consequently, delays in stringer placement typically cause a wing panel to stay in a stringer placement cell longer than desired, which may impede progress on an assembly line.

Therefore, it would be desirable to have a method and apparatus that take into account at least some of the issues discussed above, as well as other possible issues.

SUMMARY

Embodiments described herein fabricate tows from multiple lanes of unhardened fiber reinforced composite materials. The lanes are placed side-by-side to form a multi-lane tow comprising segments of separately laid-up fiber reinforced material. This eliminates the need to cut entire plies from a broadgood sheet of material and reduces waste, which reduces "Buy to Fly" costs. A release film is placed against the multi-lane tow. The release film bears shear stresses applied by a PBP machine, and enhances the ability of the multi-lane tow to bear load. Embodiments described herein may further stack plies at a multi-lane tow to form a multi-lane tow having multiple layers. One advantage is to stabilize the physical structure of the multi-lane tow to increase its resistance to shear forces applied during PBP forming processes. PBP forming of stack plies also increase the throughput of the machine because fewer forming steps are required to fabricate the composite part.

One embodiment is a method for preparing a preform for hardening into a composite part. The method includes dispensing a first set of lanes, that each comprise a tow of fiber-reinforced material, at a first angle such that the lanes are placed side-by-side with respect to each other, forming a first layer of a multi-lane tow. The method further includes applying a film directly in contact with multi-lane tow that resists shear forces applied to the multi-lane tow, transporting the multi-lane tow to a mandrel, and compacting the multi-lane tow via a Ply-By-Ply (PBP) machine disposed at the mandrel. The method further comprises removing the film from the multi-lane tow.

A further embodiment is a non-transitory computer readable medium embodying programmed instructions which, when executed by a processor, are operable for performing a method for preparing a preform for hardening into a composite part. The method includes dispensing a first set of lanes, that each comprise a tow of fiber-reinforced material, at a first angle such that the lanes are placed side-by-side with respect to each other, forming a first layer of a multi-lane tow. The method further includes applying a film directly in contact with multi-lane tow that resists shear forces applied to the multi-lane tow, transporting the multi-lane tow to a mandrel, and compacting the multi-lane tow via a Ply-By-Ply (PBP) machine disposed at the mandrel. The method further comprises removing the film from the multi-lane tow.

A further embodiment is an apparatus for preparing a preform for hardening into a composite part. The apparatus includes multiple tape dispensing heads that each dispense a tow of fiber-reinforced material to form a multi-lane tow, an end effector that applies a film directly in contact with the multi-lane tow, a Pick-and-Place (PNP) machine that transports the multi-lane tow, and a Ply-By-Ply (PBP) machine that compacts the multi-lane tow onto a preform.

Embodiments described herein also provide for enhanced placement of preforms for stringers onto a wing panel preform in an assembly environment.

One embodiment is a method for placing a stringer preform upon a wing panel preform. The method includes creating a wing panel preform upon a layup mandrel, and applying stringer preforms to the wing panel preform in a single batch placement.

Another embodiment is a method for placing a stringer preform upon a wing panel preform. The method includes creating a wing panel preform upon a layup mandrel, creating stringer preforms that each include a blade, and placing each of the stringer preforms onto the wing panel preform while maintaining a constant, uniform angle shared between the blades.

Another embodiment is a method for placing a stringer preform upon a wing panel preform. The method includes creating a wing panel preform upon a layup mandrel, pulsing the wing panel preform through a series of stations, and applying stringer preforms to the wing panel preform at each station while the wing panel preform progresses through the stations.

A further embodiment is a method for splicing stringer preforms. The method includes creating a wing panel preform upon a layup mandrel, creating stringer preform sections, placing a first stringer preform section upon the wing panel preform, and splicing a second stringer preform section to the first stringer preform section.

A further embodiment is an apparatus for an aircraft assembly. The apparatus includes a wing panel preform, and a first stringer preform section spliced to a second stringer preform section upon the wing panel preform.

A yet further illustrative example is a method for placing stringer preforms upon a wing panel preform. The method includes creating the wing panel preform upon a layup mandrel, advancing the wing panel preform in a process direction, applying a first stringer preform to the wing panel preform at a first station, advancing the wing panel preform with the first stringer preform further in the process direction; and applying a second stringer preform to the wing panel preform at a second station.

A yet further illustrative example is a method for placing stringer preforms upon a wing panel preform. The method includes creating a wing panel preform upon a layup mandrel; advancing the wing panel preform in a process direction; applying first stringer preform sections to the wing panel preform at a first station; advancing the wing panel preform with the first stringer preform sections further in the process direction; and applying second stringer preform sections to the wing panel preform at a second station.

Other illustrative embodiments (e.g., methods, apparatus and computer-readable media relating to the foregoing embodiments) may be described below. The features, functions, and advantages that have been discussed can be achieved independently in various embodiments or may be combined in yet other embodiments further details of which can be seen with reference to the following description and drawings.

BRIEF DESCRIPTION OF THE DRAWINGS

Some embodiments of the present disclosure are now described, by way of example only, and with reference to the accompanying drawings. The same reference number represents the same element or the same type of element on all drawings.

FIGS. 3-10 are end views of layup and transportation of a multi-lane tow in an illustrative embodiment.

FIGS. 15-22 illustrate fabrication of a preform for a stringer in an illustrative embodiment.

FIGS. 30-36 illustrate fabrication of a preform for a stringer in a further illustrative embodiment.

FIGS. 37-43 illustrate fabrication of a preform for a stringer in a further illustrative embodiment.

FIGS. 44-50 illustrate fabrication of a preform for a stringer in a further illustrative embodiment.

DETAILED DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are laid-up in multiple layers that together are referred to as a preform. Individual fibers within each layer of the preform are aligned parallel with each other, but different layers may exhibit different fiber orientations in order to increase the strength of the resulting composite part along different dimensions. The preform may include a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber may be infused with resin prior to hardening or curing. For thermoset resins, the hardening is a one-way process referred to as curing, while for thermoplastic resins, the resin may reach a viscous form if it is re-heated.

Figure 1:
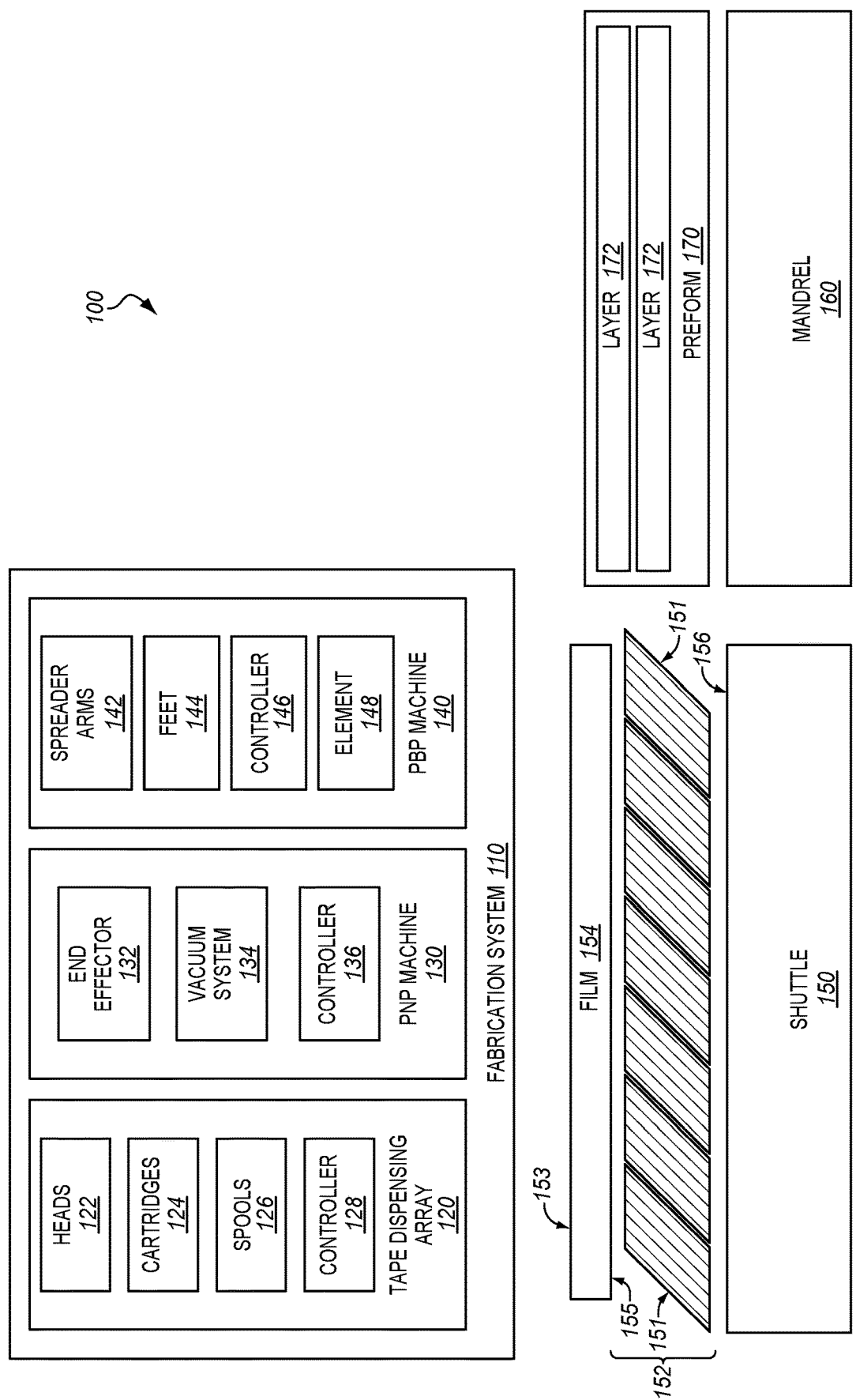
FIG. 1 is a block diagram of a fabrication environment in an illustrative embodiment.

FIG. 1 is a block diagram of a fabrication environment 100 in an illustrative embodiment. Fabrication environment 100 includes fabrication system 110, which creates a multi-lane tow 152 via tape dispensing array 120, places the multi-lane tow 152 onto a mandrel 160 (or preform 170) via Pick-and-Place (PNP) machine 130, and compacts the multi-lane tow 152 into place via PBP machine 140 (also referred to herein as a "PBP forming machine" or "single ply forming machine"). Here, the term "tow" refers to any width of unhardened composite material which can be spooled and dispensed for automated placement. Widths of tow may vary, in the range of one eighth of an inch up to six inches or more, depending on the application and design of the composite part.

In this embodiment, tape dispensing array 120 comprises spools 126 which store continuous lengths of unidirectional fiber-reinforced material. Other fiber reinforced material forms may include woven fiber fabric or discontinuous fiber mat. Cartridges 124 adjust an angle of the heads 122 with respect to layup surface 156, and heads 122 physically dispense lanes 151 of fiber reinforced material from the spools 126 to form the multi-lane tow 152 onto the layup surface 156. In these illustrative examples, each of the lanes 151 is laid-up by a different head of a tape dispensing array 120. Controller 128 manages the operations of tape dispensing array 120 (e.g., to control the cartridges 124 and to adjust an angle of heads 122), and may also coordinate the motion of shuttle 150 relative to tape dispensing array 120. In some illustrative examples, the controller 128 directs the tape dispensing heads 122 to dispense a first set of lanes 151 at a first angle such that the lanes 151 are placed side-by-side with respect to each other, forming a first layer of the multi-lane tow 152. Because tape dispensing array 120 fabricates the multi-lane tow 152 from multiple lanes of fiber reinforced material, there is no need to cut plies from a broadgood sheet of fiber reinforced material, and the amount of waste involved in fabrication is reduced. Furthermore, because there are multiple heads 122 which are used to perform layup (e.g., one per lane), the speed of fabrication is beneficially increased.

PNP machine 130 dispenses the film 154 (e.g., a layer of Fluorinated Ethylene Propylene (FEP), a layer of Ethylene Tetrafluoroethylene (ETFE), etc.) onto multi-lane tow 152, and may physically pick up and place the multi-lane tow 152 onto a layer 172 of preform 170, or onto the mandrel 160. In this embodiment, PNP machine 130 includes end effector 132 and vacuum system 134, which together operate in accordance with instructions from a Numerical Control (NC) program stored in a memory of controller 136. Film 154 includes an engineered surface 155 (e.g., a textured surface) that contacts the multi-lane tow 152 and facilitates tack to the multi-lane tow 152, and further includes an engineered surface 153 (e.g., a smooth surface) that contacts the PBP machine 140 during compaction. The engineered surface 153 facilitates sliding of an element 148 (or a nose piece, or air bladder) of the PBP machine 140 along the film 154. The film 154 includes an engineered surface 155 that contacts the multi-lane tow 152 and adheres to the multi-lane tow 152 during transport by the PNP machine 130, and an engineered surface 153 that contacts the PBP machine 140 during compaction.

In this embodiment, PBP machine 140 includes spreader arms 142, which together pull the element 148 taut against the preform 170 to compact the preform 170 against mandrel 160 while feet 144 hold a center portion of preform 170 in place to prevent translation of preform 170. In some illustrative examples, feet 144 are referred to as "stomp feet". Actions performed by PBP machine 140 are managed by controller 146.

In further embodiments, the PBP machine 140 includes a nose or an air bladder that is controlled to follow a preform or mandrel shape from the stomp foot to the edge of part. This operation is performed similarly to the operation of smoothing a bedsheet by sliding one's hand across the surface. Thus, the preform 170 is tensioned by sliding the element 148 along the surface starting from the stomp foot outward, with any wrinkles being smoothed out. This action physically forms the ply against the preform or mandrel.

In further embodiments different types of PBP machines 140 may be utilized. For example, in further embodiments, the PBP machine 140 includes a nose or an air bladder that is controlled to follow a preform or mandrel shape from a stomp foot to an edge of the preform. This operation is performed similarly to the operation of smoothing a bedsheet by sliding one's hand across the surface. This action physically forms the ply into a desired shape.

Figure 1A:
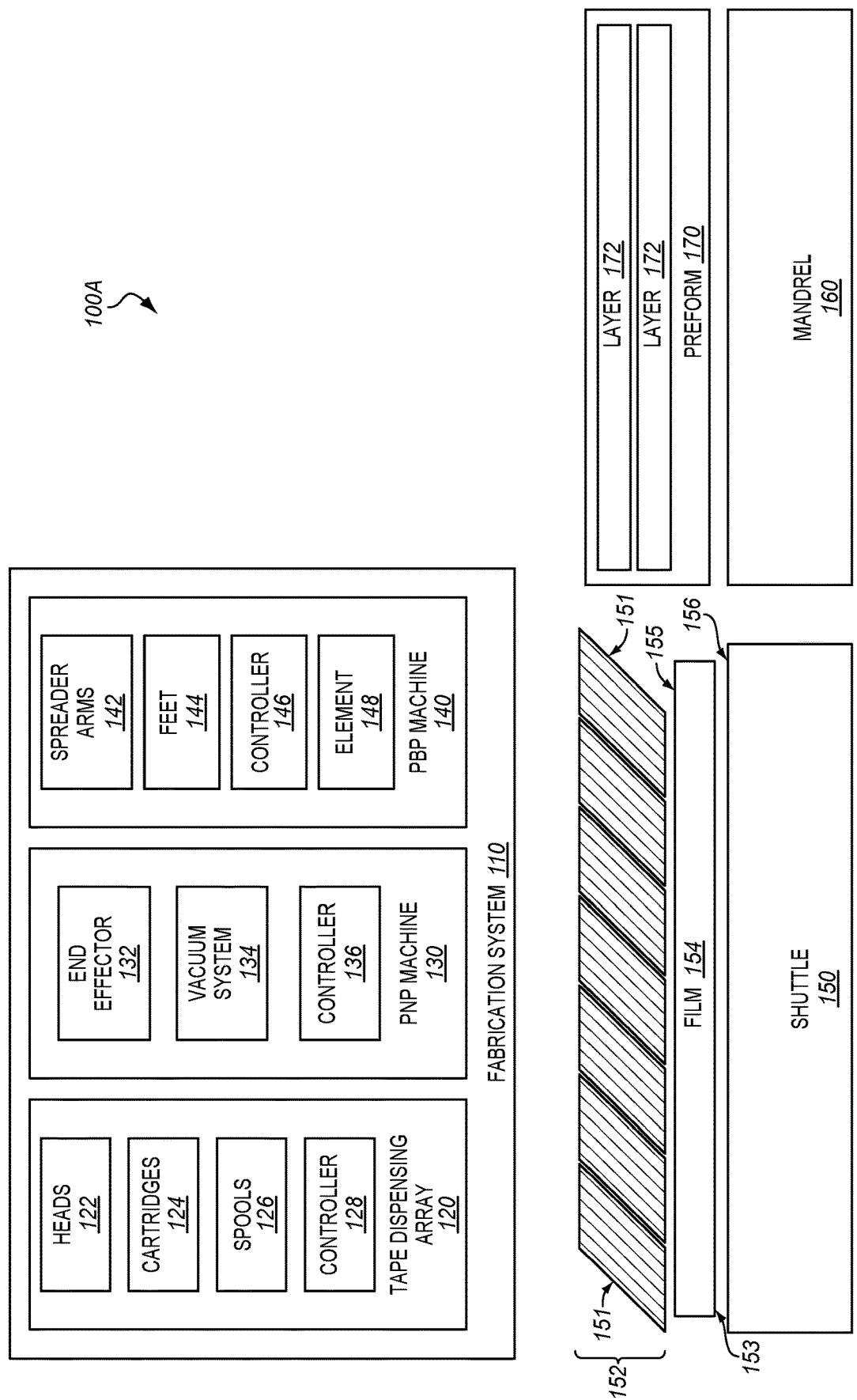
FIG. 1A is a block diagram of a fabrication environment in an illustrative embodiment.

FIG. 1A, shows a block diagram of a fabrication environment 100A in a further illustrative embodiment. In this embodiment, the PNP machine 130 first dispenses the film 154 (e.g., a layer of Fluorinated Ethylene Propylene (FEP), a layer of Ethylene Tetrafluoroethylene (ETFE), etc.) onto the layup surface 156 of the shuttle 150. The film 154 is dispensed such that engineered surface 153 is positioned downward and contacts the shuttle 150 and engineered surface 155 is positioned upward for subsequent dispensing of fiber reinforced material.

In this embodiment, cartridges 124 adjust an angle of the heads 122 with respect to layup surface 156, and heads 122 physically dispense lanes 151 of fiber reinforced material from the spools 126 to form the multi-lane tow 152 onto the engineered surface 155 of the film 154. Controller 128 manages the operations of tape dispensing array 120 (e.g., to control the cartridges 124 and to adjust an angle of heads 122), and may also coordinate the motion of shuttle 150 relative to tape dispensing array 120.

Illustrative details of the operation of fabrication environment 100 and 100a will be discussed with regard to FIG. 2 and FIG. 2A. Assume, for these embodiments, that mandrel 160 awaits receipt of multi-lane tows 152 that will be compacted together to result in the preform 170.

Figure 2:
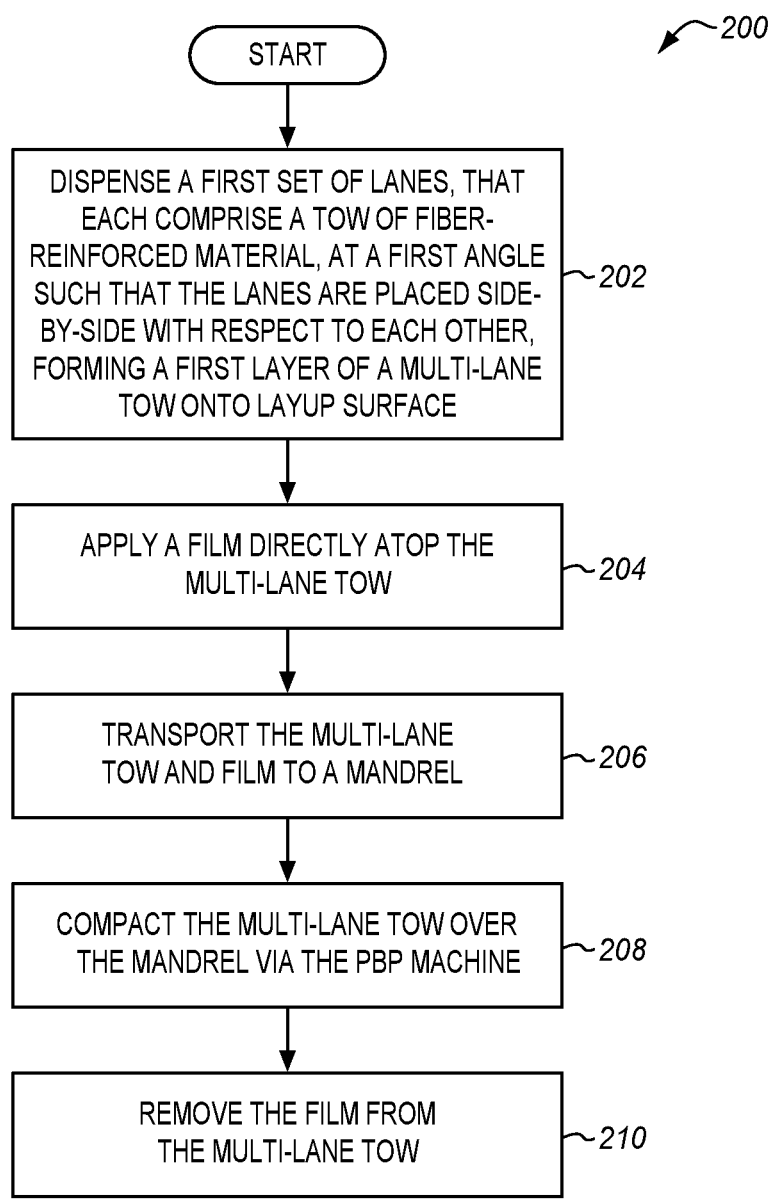
FIG. 2 is a flowchart illustrating a method for creating a multi-lane tow and using it with a PBP machine in an illustrative embodiment.

FIG. 2 is a flowchart illustrating a method 200 for creating a multi-lane tow and its use with a PBP machine 140 in an illustrative embodiment. The steps of method 200 are described with reference to fabrication system 110 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, controller 128 operates tape dispensing array 120 to dispense a first set of lanes 151 of unidirectional fiber-reinforced material. The lanes are disposed at a first angle such that they are placed side-by-side with respect to each other, forming a first layer of a multi-lane tow 152. As used herein, lanes that are placed "side-by-side" are disposed such that their sides (i.e., the edges that are neither the leading edge nor the trailing edge during dispensing) contact each other or include a nominal gap, but do not overlap.

In further embodiments, the multi-lane tow 152 may be shuttled via shuttle 150 along its length, and a second set of lanes 151 may be dispensed atop the first layer at a second angle such that the second set of lanes are placed side-by-side with respect to each other. This forms a second layer of the multi-lane tow 152 that has the same or a different fiber orientation than the first layer. A multi-lane tow 152 that comprises multiple layers having a variety of fiber orientations may be particularly resilient when resisting shear forces applied by a PBP machine 140 during compaction.

In step 204, controller 136 operates PNP machine 130 to apply a film 154 directly in contact with, and specifically atop the multi-lane tow 152. This may comprise placing engineered surface 155 against multi-lane tow 152, and pressing the film 154 into place. The film 154 enhances physical integrity of the multi-lane tow 152 during PNP operations, and further resists shear forces applied during PBP forming. The film may additionally facilitate sliding of element 148 across the multi-lane tow 152.

In step 206, controller 136 operates the PNP machine 130 to transport the multi-lane tow 152 and the film 154 to a mandrel 160. (e.g., via action of the vacuum system 134 in combination with end effector 132). This may comprise gripping the film 154 and the multi-lane tow 152 via suction, moving these components to the mandrel 160, and releasing these components. In some illustrative examples, at least one layer 172 of preform 170 is already present on mandrel 160. In some illustrative examples, the multi-lane tow 152 is a first layer transported to mandrel 160. A Ply-By-Ply (PBP) machine 140 is disposed at the mandrel 160. In some illustrative examples in step 206, controller 136 operates the PNP machine 130 to transport the multi-lane tow 152 and the film 154 to a PBP machine 140 (e.g., via action of the vacuum system 134 in combination with end effector 132). This may comprise gripping the film 154 and the multi-lane tow 152 via suction, moving these components to the preform 170, and releasing these components.

In step 208, the PBP machine 140 compacts the multi-lane tow 152 over the mandrel 160 to form a layer 172 of the preform 170. The multi-lane tow 152 is compacted via a Ply-By-Ply (PBP) machine 140 disposed at the mandrel 160. In some illustrative examples, multi-lane tow 152 is a first layer of preform 170 on mandrel 160. In some other illustrative examples, at least one layer 172 of preform 170 is already present on mandrel 160 and compacting the multi-lane tow 152 over the mandrel 160 compacts the multi-lane tow 152 onto preform 170. In some illustrative examples, in step 208, the PBP machine 140 compacts the multi-lane tow 152 onto preform 170. In one embodiment, the PBP machine 140 performs this task by spreading the spreader arms 142 while feet 144 hold preform 170 and multi-lane tow 152 in place. This action presses an element 148 (e.g., a veil, a nose piece, or an air bladder) against the multi-lane tow 152, compacting it into a desired shape and making it integral with preform 170. In further embodiments, a nose piece or air bladder of the PBP machine 140 performs a similar role. During compaction, film 154, positioned between element 148 and the multi-lane tows 152, bears shear stresses that are applied via the element 148. The film 154 also holds the multi-lane tow 152 together during PNP and PBP operations, operating as a backing material.

The compaction process performed by the PBP machine 140 may result in a stringer having any desired cross-sectional shape, depending on the shape of the mandrel 160. Examples of such shapes include angles (L or similar cross section), hat shapes (e.g., rounded or trapezoidal hat shapes, C-shapes, and others.

In step 210, PNP machine 130 removes the film 154 from the multi-lane tow 152, for example, by pulling the film 154 off of the multi-lane tow 152. Because the multi-lane tow 152 has been compacted onto the preform 170, the force required to remove the film 154 from the multi-lane tow 152 is less than the force required to remove the multi-lane tow 152 from the preform 170. The film 154 may be removed by peeling the film 154 from an end or corner.

Steps 202-210 may be repeated as desired. For example, the steps of dispensing, applying, transporting, compacting, and removing may be iteratively performed to fabricate, place, and compact multiple multi-lane tows 152 onto a preform 170 to increase a size (e.g., a thickness or length, or both) thickness of the preform.

Figure 2A:
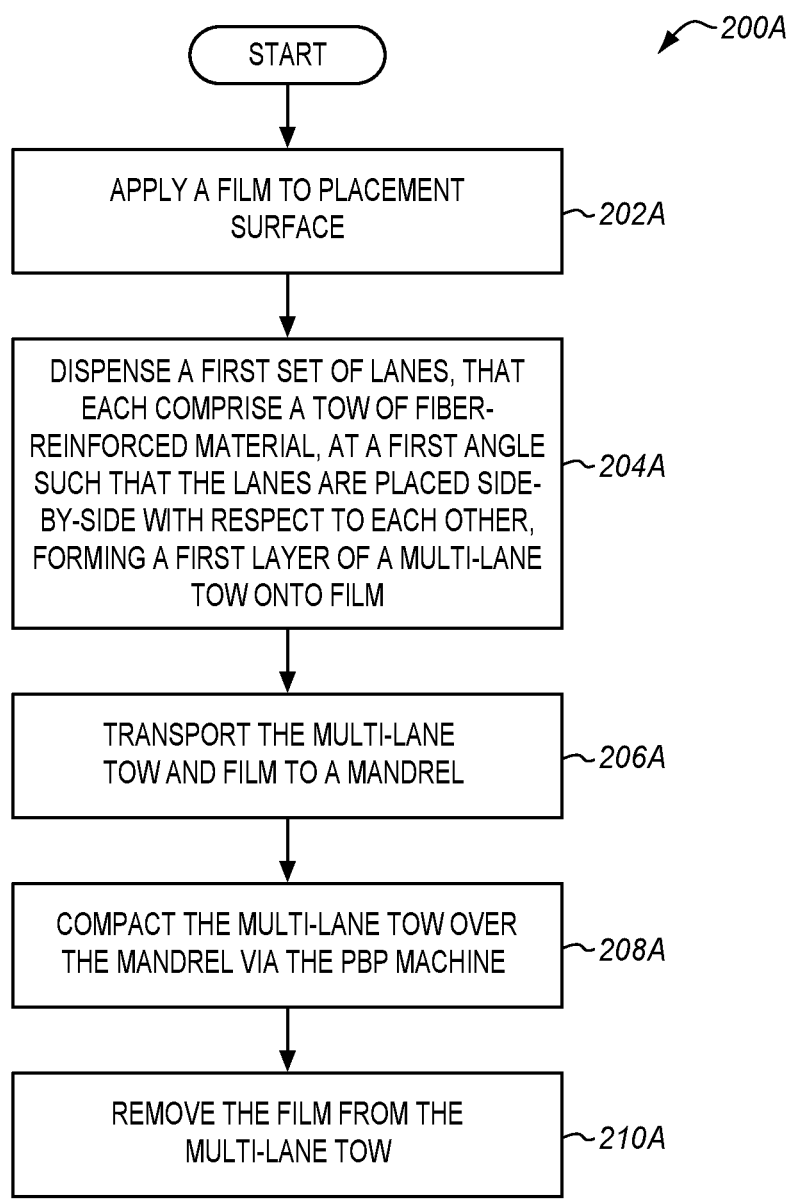
FIG. 2A is a flowchart illustrating a method for creating a multi-lane tow and using it with a PBP machine in an illustrative embodiment.

FIG. 2A is a flowchart illustrating a further embodiment, method 200A, for creating a multi-lane tow 152, and as well as use of a multi-lane tow 152 with a PBP machine 140 in an illustrative embodiment. The steps of method 200A are described with reference to fabrication system 110 of FIG. 1A, but those skilled in the art will appreciate that method 200A may be performed in other systems. The steps of the flowcharts described herein are not all inclusive and may include other steps not shown. The steps described herein may also be performed in an alternative order.

In step 202A, controller 136 operates PNP machine 130 to apply a film 154 to the layup surface 156 of the shuttle 150. This may comprise placing engineered surface 153 of film 154 against the layup surface 156 of shuttle 150 and pressing the film 154 into place. The film 154 will be in direct contact with the multi-lane tow 152 and will enhance physical integrity of the multi-lane tow 152 during PNP operations, and further resists shear forces applied during PBP forming. The film may additionally facilitate sliding of element 148 across the multi-lane tow 152.

In step 204A, controller 128 operates tape dispensing array 120 to dispense a first set of lanes 151 of unidirectional fiber-reinforced material onto the engineered surface 155 of the film 154. The lanes are disposed at a first angle such that they are placed side-by-side with respect to each other, forming a first layer of a multi-lane tow 152. As used herein, lanes that are placed "side-by-side" are disposed such that their sides (i.e., the edges that are neither the leading edge nor the trailing edge during dispensing) contact each other or include a nominal gap, but do not overlap.

In further embodiments, the multi-lane tow 152 may be shuttled via shuttle 150 along its length, and a second set of lanes 151 may be dispensed atop the first layer at a second angle such that the second set of lanes are placed side-by-side with respect to each other. This forms a second layer of the multi-lane tow that has the same or a different fiber orientation than the first layer. A multi-lane tow 152 that comprises multiple layers having a variety of fiber orientations may be particularly resilient when resisting shear forces applied by a PBP machine 140 during compaction.

In step 206A, controller 136 operates the PNP machine 130 to transport the multi-lane tow 152 and the film 154 to a mandrel 160 (e.g., via action of the vacuum system 134 in combination with end effector 132). In some illustrative examples, in step 206A, controller 136 operates the PNP machine 130 to transport the multi-lane tow 152 and the film 154 to a PBP machine 140 (e.g., via action of the vacuum system 134 in combination with end effector 132). This may comprise gripping the film 154 and the multi-lane tow 152 via suction, moving these components to the preform 170, and releasing these components. In this embodiment, the film 154 and the multi-lane tow 152 may be flipped, inverted, or otherwise positioned such that the multi-lane tow 152 is held in contact with the preform 170 at the PNP machine 130.

In step 208A, In some illustrative examples of the PBP machine 140 compacts the multi-lane tow 152 over the mandrel 160. In some illustrative examples, multi-lane tow 152 is a first layer of preform 170 on mandrel 160. In some other illustrative examples, at least one layer 172 of preform 170 is already present on mandrel 160 and compacting the multi-lane tow 152 over the mandrel 160 compacts the multi-lane tow 152 onto preform 170. In some illustrative examples of step 208A, the PBP machine 140 compacts the multi-lane tow 152 onto preform 170. In one embodiment, the PBP machine 140 performs this task by spreading the spreader arms 142 while feet 144 hold preform 170 and multi-lane tow 152 in place. This action presses an element 148 (e.g., a veil, a nose piece, or an air bladder) against multi-lane tow 152, compacting it into a desired shape and making it integral with preform 170. In further embodiments, a nose piece or air bladder of the PBP machine 140 performs a similar role. During compaction, film 154, positioned between element 148 and the multi-lane tows 152, bears shear stresses that are applied via the element 148. The film 154 also holds the multi-lane tow 152 together during PNP and PBP operations, operating as a backing material.

The compaction process performed by the PBP machine 140 may result in a stringer having any desired cross-sectional shape, depending on the shape of the mandrel 160. Examples of such shapes include angles (L or similar cross section), hat shapes (e.g., rounded or trapezoidal hat shapes, C-shapes, and others.

In step 210A, PNP machine 130 removes the film 154 from the multi-lane tow 152, for example, by pulling the film 154 off of multi-lane tow 152. Because multi-lane tow 152 has been compacted onto preform 170, the force required to remove the film 154 from the multi-lane tow 152 is less than the force required to remove the multi-lane tow 152 from the preform 170. The film 154 may be removed by peeling the film 154 from an end or corner.

Steps 202A-210A may be repeated as desired. For example, the steps of dispensing, applying, transporting, compacting, and removing may be iteratively performed to fabricate, place, and compact multiple multi-lane tows onto a preform to increase a size (e.g., a thickness or length, or both) thickness of the preform.

Methods 200 and 200A provide a substantial technical benefit over prior systems, because its multi-lane tows result in less waste, increased fabrication speed, and reduced labor. Furthermore, the use of a film 154 helps to ensure that each multi-lane tow 152 is held together and is capable of resisting shear forces applied by a PBP machine 140, at least because the firm bears shear forces applied by a veil, nose piece, or air bladder of the PBP machine 140. Thus, even though a multi-lane tow would be expected to suffer issues relating to distorting or stretching mentioned in the background, the use of the film (and/or multiple layers) enables the multi-lane tow to bear the shear forces while complying with design requirements.

FIGS. 3-10 are end views of layup and transportation of a multi-lane tow 152 in an illustrative embodiment. Specifically, FIGS. 3-6 illustrate layup of the multi-lane tow 152, and FIGS. 7-10 illustrate transportation of the multi-lane tow 152.

According to FIG. 3, a perforated layer 330 of Fluorinated Ethylene Propylene (FEP) is placed atop a vacuum platen 320 disposed at a layup mandrel 310. The vacuum platen 320 applies suction that holds the perforated layer 330 in place. The vacuum platen 320 may then be moved along a track to a new station. In some illustrative examples, vacuum platen 320 and layup mandrel 310 is an example of an implementation of shuttle 150 of FIG. 1. In some illustrative examples, vacuum platen 320 and layup mandrel 310 can be referred to as a shuttle.

In FIG. 4, an Automated Tape Layup Machine (ATLM) head 410, which is movably attached to a frame 420 that is indexed to the layup mandrel 310, lays up a multi-lane tow 430 comprising one or more layers. The vacuum platen 320 may then proceed to a cutting station. In further embodiments, platens and/or tows may be rotated prior to pick and place (PNP) operations as desired.

In FIG. 5, cutter heads 510, which are movably attached to a frame 520 that is indexed to the layup mandrel 310, cut excess material from the multi-lane tow 430. In one embodiment, cutting is performed using an ultrasonic knife to enable fabrication of a pre-form to a desired engineering shape or to meet engineering requirements. In the current embodiment, the cutting is illustrated after layup of the multi-lane tow 430. However, in further embodiments, this action takes place after application of a film to the multi-lane tow and prior to PNP of the multi-lane tow to the pre-form or mandrel. In FIG. 6, suction heads 610, which are movably attached to a frame 620 that is indexed to the layup mandrel 310, pick up and remove the excess material (e.g., by applying greater suction than the vacuum platen 320, or by applying suction to the excess material while the vacuum platen 320 is turned off). At this point in time, the multi-lane tow 430 is laid-up and cut to a desired shape, and ready for transport to a PBP machine. Thus, the vacuum platen 320 may proceed to a PNP station.

FIGS. 7-10 illustrate transportation of the laid-up multi-lane tow. In FIG. 7, a film 730 is applied atop the multi-lane tow 430, and a PNP head 710, which is movably attached to a frame 720 indexed to the layup mandrel 310, is aligned with the multi-lane tow 430. In FIG. 8, the PNP head 710 moves downward to contact the film 730. The vacuum platen 320 releases applied suction, and the PNP head 710 applies suction to the film 730, rising upward as shown in FIG. 9 in a controlled fashion monitored by a sensor or camera 900. In FIG. 10, the PNP head 710 is positioned over a base 1000 having a consolidation mandrel 1010, and the multi-lane tow 430 is dispensed atop the consolidation mandrel 1010 and formed into a desired shape. The shape and length of the consolidation mandrel 1010 varies depending on the type of part being fabricated.

The steps illustrated in FIGS. 3-10 provide one embodiment of how initial layup and placement of a multi-lane tow 430 may be performed when fabricating a lengthwise portion of a preform such as a stringer. In a further embodiment, film 730 is omitted and perforated layer 330 is transported with multi-lane tow 430 to consolidation mandrel 1010. In this embodiment, PNP head 710 may receive a flipped, inverted or otherwise positioned film 730 and multi-lane tow 430 such that the multi-lane tow 430 is held in direct contact with the preform or surface of consolidation mandrel 1010.

Figure 11A:
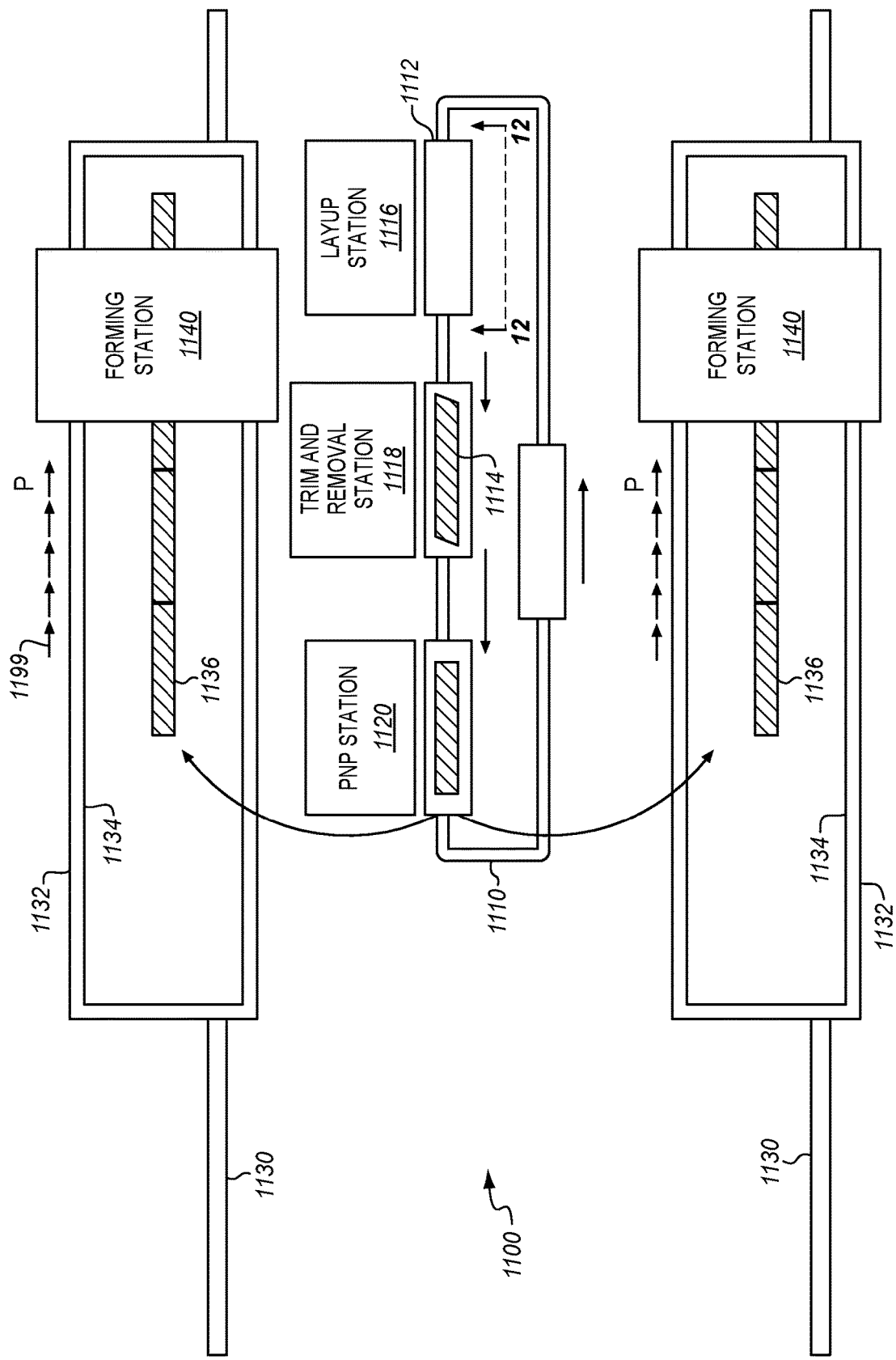
FIGS. 11A, 11B, and 11C are block diagrams of line fabrication environments for multi-lane tows in an illustrative embodiment.
Figure 11B:
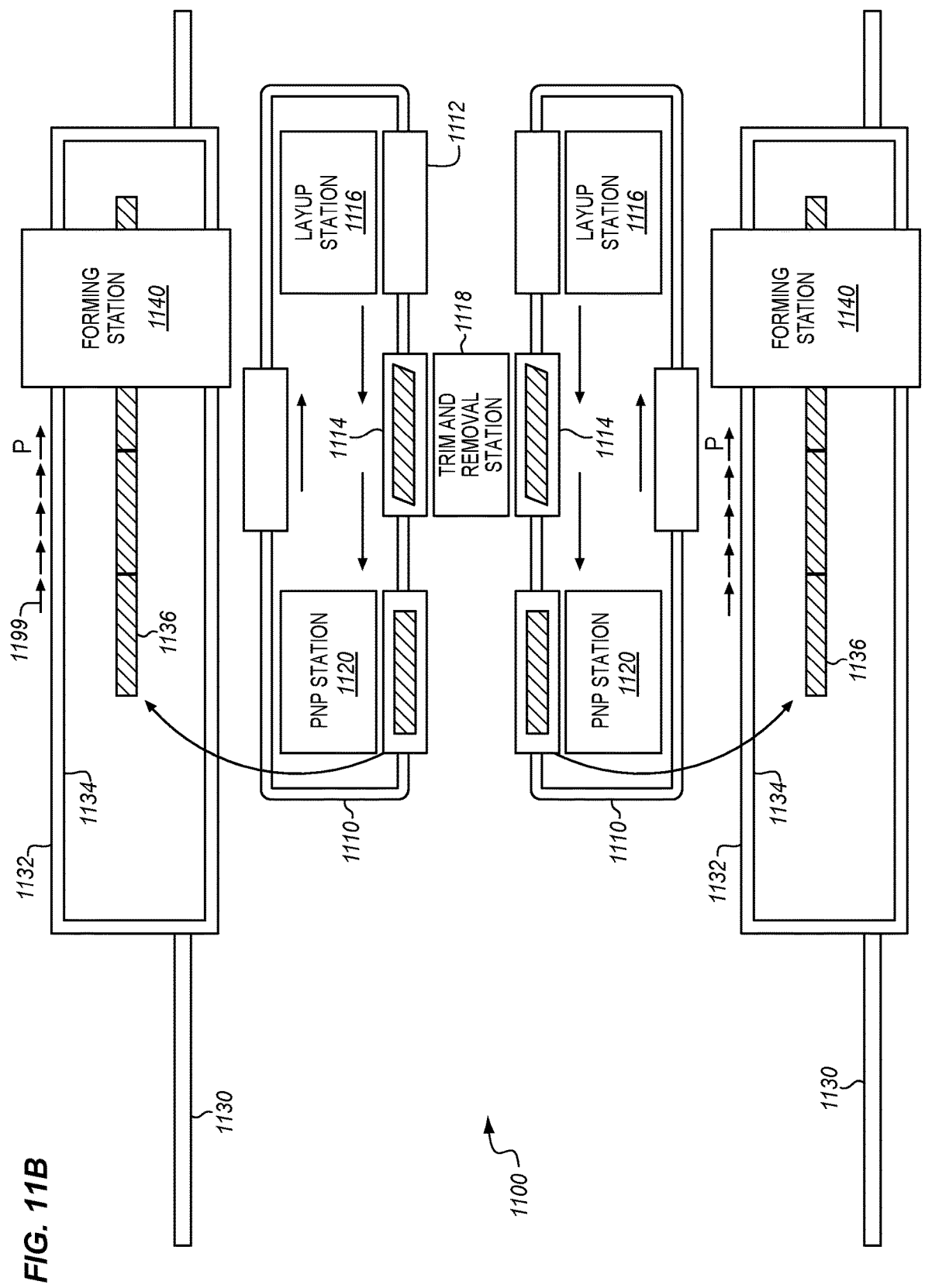
Figure 11C:
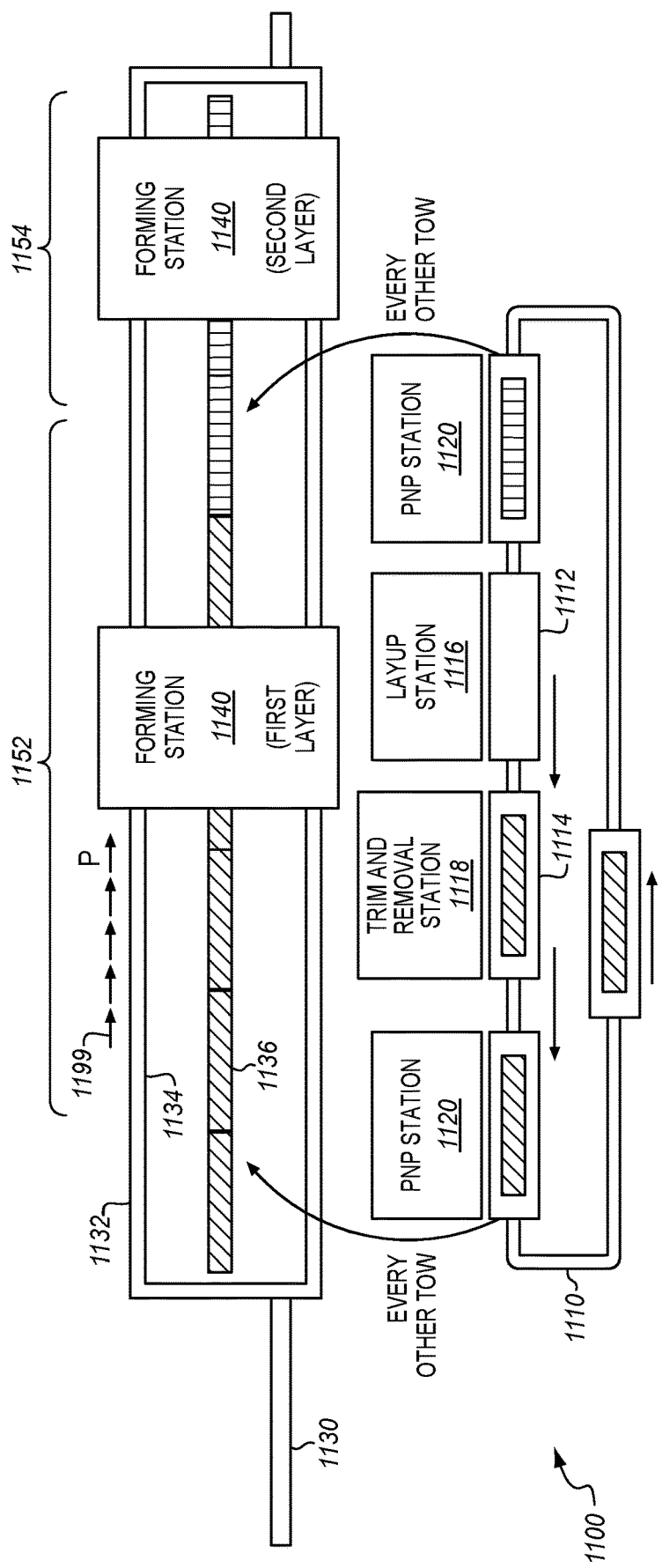

FIGS. 11A, 11B, and 11C are block diagrams of line fabrication environments for multi-lane tows in an illustrative embodiment. In FIG. 11A, a line fabrication environment 1100 includes a track 1110 along which a cart 1112 loops repeatedly. The cart 1112 proceeds from a layup station 1116, where it receives layup for a multi-lane tow 1114, to a trim and removal station 1118, which cuts the multi-lane tow 1114 to desired dimensions and removes excess material. The cart 1112 then proceeds to PNP station 1120, which disposes multi-lane tows in alternating fashion onto mandrels 1134 for two neighboring forming stations. For each forming station 1140, a cart 1132 proceeds along a track 1130. The cart 1132 carries a mandrel 1134, onto which a preform 1136 having a desired length (e.g., tens of feet) is laid-up. The shape and length of the mandrel 1134 varies depending on the type of part being fabricated.

The preform 1136 consists of multiple multi-lane tows. The carts 1132 pulse in direction 1199 (also labeled "P") by small amounts (e.g., the width of a multi-lane tow) in order to enable the forming stations 1140 to form the multi-lane tows 1114 into conformance with the mandrels 1134. The configuration shown in FIG. 11A provides a technical benefit by increasing throughput in scenarios where forming stations 1140 operate more slowly than layup station 1116.

In FIG. 11B, the line fabrication environment 1100 includes two separate layup stations that fabricate multi-lane tows 1114 along tracks 1110 which are separated. A single trim and removal station 1118 trims multi-lane tows for both of the layup stations 1116, and separate instances of PNP stations 1120 provide the multi-lane tows 1114 to two separate forming stations. The configuration shown in FIG. 11B provides a benefit by increasing throughput in environments where trim and removal station 1118 operates at a faster rate than a layup station 1116.

In FIG. 11C, a layup station 1116 is paired with two PNP stations 1120. In this embodiment, the multi-lane tows 1114 are alternatingly placed on a first layer of the preform 1136 (in region 1152) and onto a second layer of the preform 1136 (in region 1154). Each layer is formed by a forming station 1140, and the multi-lane tows 1114 in different layers may exhibit different fiber orientations. Tows in the second layer are placed atop tows in the first layer, in order to increase a thickness of the preform 1136. Just like in FIG. 11A, the configuration shown in FIG. 11B provides a technical benefit by increasing throughput in scenarios where forming stations 1140 operate more slowly than layup station 1116.

FIGS. 11A, 11B, and 11C illustrate but several of countless embodiments via which line assembly of preforms may be accomplished. In further embodiments, any suitable combination of tracks, stations, and machinery may be implemented to account for production criteria (e.g., the operational speed of individual stations).

Figure 12:
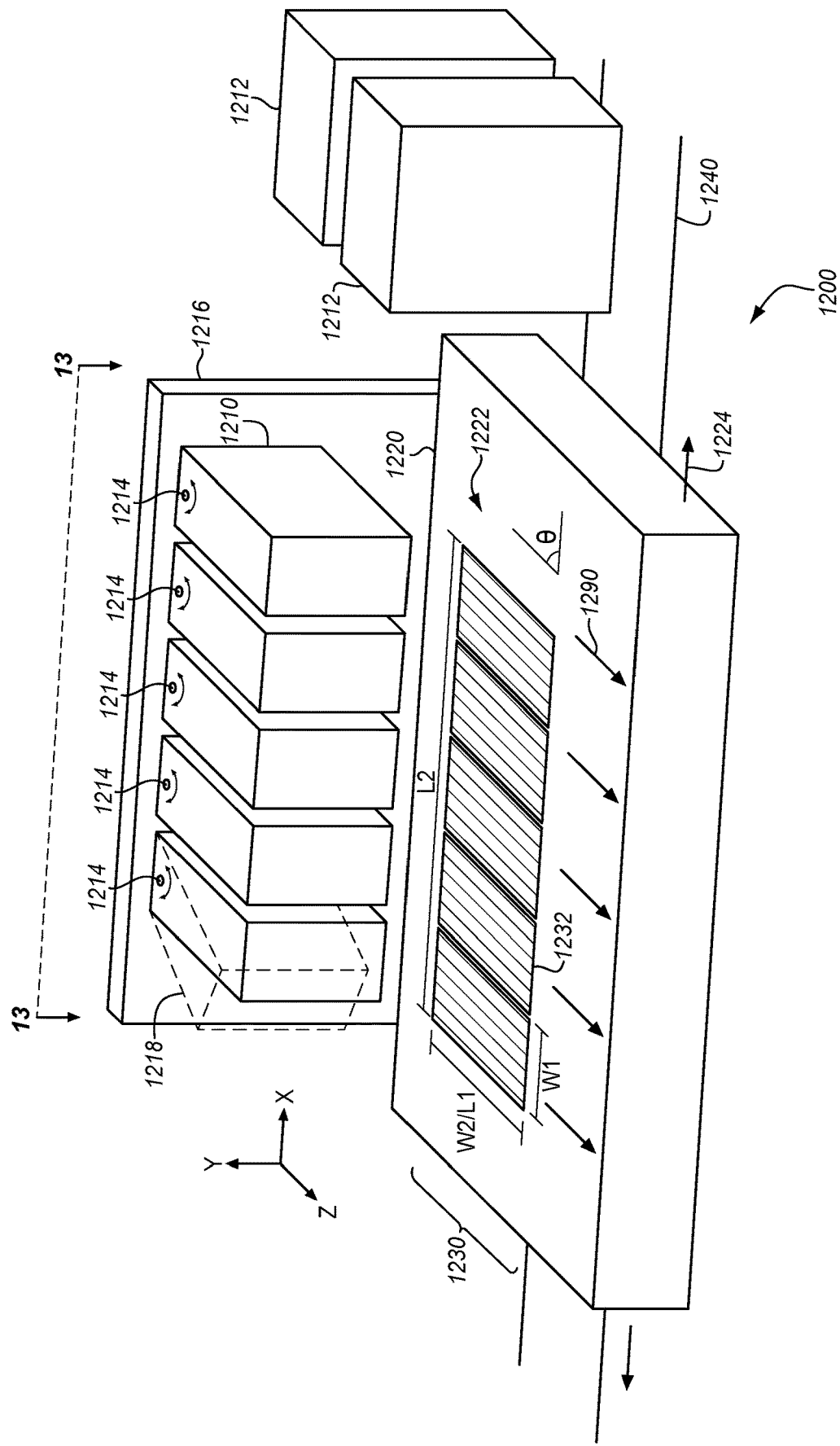
FIG. 12 is a perspective view of fabrication of a multi-lane tow in an illustrative embodiment.

FIG. 12 is a perspective view of a lamination system 1200 for fabricating a multi-lane tow in an illustrative embodiment. Lamination system 1200 may comprise an array of parallel material dispensing heads, as described in U.S. Pat. No. 8,336,596. In this embodiment, lamination system 1200 includes a track 1240 upon which a shuttle 1220 moves. A multi-lane tow 1230 is dispensed upon/laid up at shuttle 1220 by heads 1210. The angle of the heads 1210 can be changed as desired from +45° to 90° (as shown) to −45° by pivoting the heads 1210 in unison about anchors 1214, (e.g., where the heads 1210 contact the frame 1216 to which they are attached) to a desired new orientation 1218. Zero-degree heads 1212 apply lanes having a zero-degree orientation.

FIG. 12 further illustrates that the shuttle 1220 has a layup surface 1222. During layup, each of the heads 1210 lays up a lane 1232 (also referred to herein as a "segment"). Each of the lanes 1232 is therefore laid-up by a different one of the heads 1210.

The heads 1210 proceed in direction 1290 as layup continues, or may proceed in the opposite of direction 1290. In this manner, the heads 1210 dispense the lanes 1232 at an angle θ such as ninety degrees (e.g., because the heads are rotated to the same angle). In further embodiments, a subset of the heads 1210 proceed in direction 1290 while a different subset of the heads 1210 proceeds in the opposite of direction 1290.

In embodiments where a multi-lane tow 1230 includes multiple layers, shuttle 1220 may move along track 1240 in directions 1224 in order to accurately position the layers with respect to each other. In this fashion, heads 1210 iteratively dispense one layer after another onto the shuttle 1220 in between movements of the shuttle 1220. In still further embodiments, zero-degree heads 1212 apply one or more lanes along the horizontal direction while the shuttle 1220 moves, in order to create a layer having a zero-degree fiber orientation. At the end of a layup movement, each of the heads 1210 cuts a corresponding one of lanes 1232 at the same length, in order to terminate the multi-lane tow 1230. Multi-lane tow 1230 has a width (W2) and a length (L2), and each lane 1232 has a width (W1, e.g., one and a half inches, or a different width that also facilitates storage on a spindle or spool) and a length (L1). In many embodiments, W2 is more than twice W1.

Figure 13:
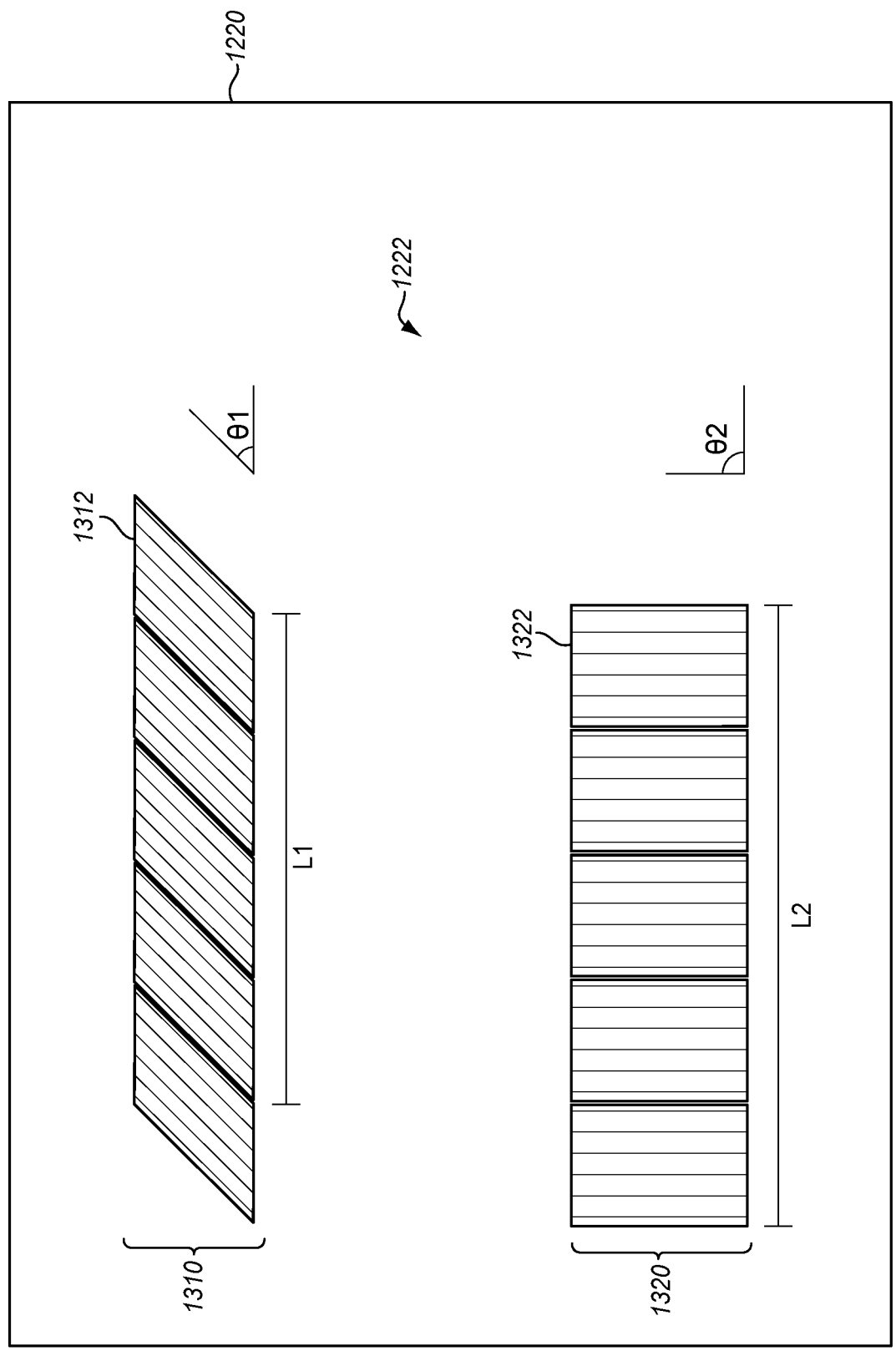
FIG. 13 is a top view of multi-lane tows fabricated for use by a PBP machine in an illustrative embodiment.

FIG. 13 is a top view of multi-lane tows fabricated for use by the PBP machine 140 of FIG. 1 in an illustrative embodiment, and corresponds with view arrows 13 of FIG. 12. In FIG. 13, a first multi-lane tow 1310 comprises segments 1312 dispensed at a first angle θ1 (e.g., 45°), and extends for a length L1 at layup surface 1222 of shuttle 1220. Excess material beyond a length L1 of the first multi-lane tow 1310 may be trimmed to form the first multi-lane tow 1310 into a rectangular shape if desired. FIG. 13 also illustrates a second multi-lane tow 1320 that comprises segments 1322 dispensed at a second angle θ2 (e.g., 90°) and extends for a length L2.

Figure 14:
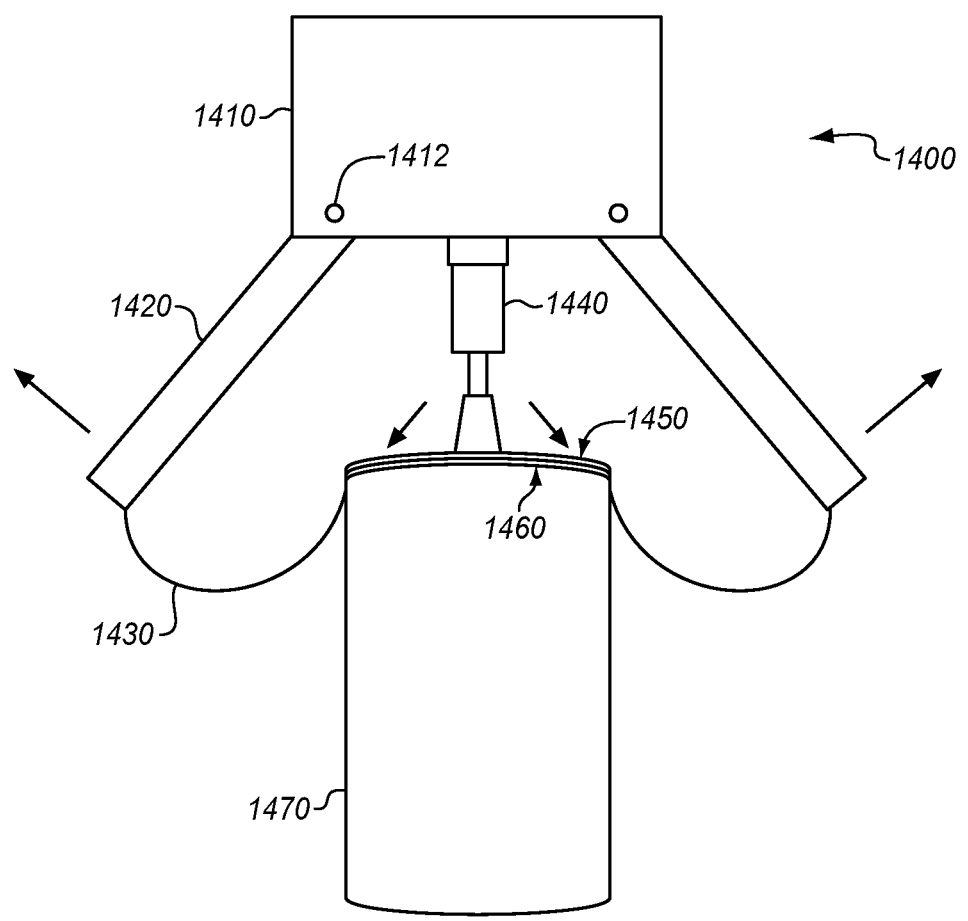
FIG. 14 is a front view of a PBP machine for compacting a multi-lane tow in an illustrative embodiment.

FIG. 14 is a front view of a PBP machine 1400 for compacting a multi-lane tow in an illustrative embodiment. In this embodiment, PBP machine 1400 includes body 1410, and a set of spreader arms 1420 which pivot about hinges 1412. A stomp foot 1440 holds film 1450, which is atop the multi-lane tow 1460 and consolidation mandrel 1470. Because the film 1450 covers the multi-lane tow 1460, the film 1450 resists shear loads applied by a veil 1430, which contacts the film 1450, and spreader arms 1420 part, which forces the veil 1430, which is coupled on either of its ends to the spreader arms 1420, directly against film 1450. In this illustrative example, the PBP machine 1400 includes the veil 1430 that is pressed into the multi-lane tow 152 by spreader arms 1420 to compact the multi-lane tow 152. The stretching of the spreader arms 1420 places the veil 1430 into tension and forces the veil 1430 downward into the film 1450, generating compression forces and shear forces at film 1450. Film 1450 bears the shear forces while transferring the compression forces to multi-lane tow 1460. This causes multi-lane tow 1460 to compact without stretching. While only one set of spreader arms 1420 and one stomp foot 1440 are shown in FIG. 14, includes additional sets of spreader arms and stomp feet that proceed into the page and carry the veil 1430. Further PBP machines alternatively may use a nose piece or air bladder, rather than veil 1430, to compress the material against the preform or mandrel by contacting the nose piece or air bladder against the multi-lane tow starting at the stomp foot and following the shape of the preform until the multi-lane tow is formed to the desired shape.

In still further embodiments, forming is performed by the systems discussed in U.S. Pat. No. 10,086,596, entitled "APPARATUS AND METHOD FOR AUTOMATED LAYUP OF COMPOSITE STRUCTURES," and/or by the systems discussed in U.S. Patent Publication 2017/0021534, entitled "SYSTEMS AND METHODS FOR INCREMENTALLY FORMING A COMPOSITE PART."

FIGS. 15-22 illustrate fabrication of a preform comprising an unhardened portion of a stringer in an illustrative embodiment. Specifically, FIGS. 15-22 illustrate fabrication and consolidation of charges via the systems of FIG. 11A, B, or C and FIG. 14 provided above. However, these FIGS. may correspond with the views depicted variously in FIGS. 1, 1A, 2, 2A, 3-10, and 14, and are not limited to the configurations of FIG. 11A, B, or C.

In FIG. 15, mandrel 1520 and mandrel 1530 are placed onto a tool 1510. Alternatively, mandrel 1520 and 1530 may be placed onto an individual tool 1510A and an individual tool 1501B. In FIG. 16, a PNP machine places one or more multi-lane tows to create a first preform 1620 and a second preform 1630 on the mandrels. Thus, a PNP machine picks up and places laid-up material in the form of multi-lane tows which are consolidated onto mandrel 1520 and mandrel 1530, respectively. In one embodiment, the multi-lane tows are made of two or more layers, and hence each applied multi-lane tow builds up a corresponding preform by at least two plies at a time. In FIG. 17, a PBP machine compacts multi-lane tows to consolidate the first preform 1620 and the second preform 1630 against the mandrels 1520 and 1530. Layup continues via the addition of additional multi-lane tows 1820 and 1830 as shown in FIG. 18, which are compacted to form the completed preforms, first preform 1920 and second preform 1930. The mandrels 1520 and 1530 are then rotated in directions 1900 and 1900A shown in FIG. 19, pushing the completed preforms into contact as shown in FIG. 20. Specifically, the first preform 1920 as-completed is placed against the second preform 1930 as-completed, and awaits placement of a gap filler at a gap between the completed preforms.

Figure 21:
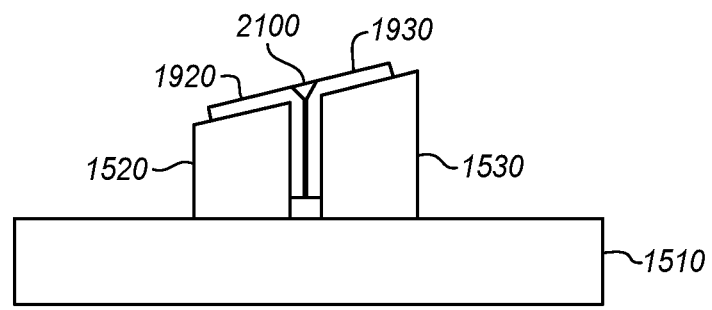
Figure 22:
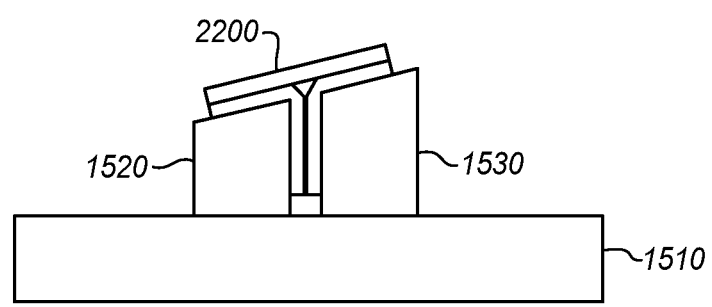

In FIG. 21, a gap filler 2100, or "noodle," is placed onto the integral preform (e.g., via a PNP machine), and in FIG. 22, a cap 2200 covers the completed preforms, first preform 1920 and second preform 1930, and the gap filler 2100. The cap 2200 can be manufactured using PNP placement and PBP forming of multi-lane tows, in a similar fashion to the completed preforms, first preform 1920 and second preform 1930 discussed above. In this manner, a stringer or other structural component is rapidly constructed. Performing build-up of the preforms in the manner described herein enables the creation of preforms for stringers or other components that have complex contours which proceed into and out of the page.

Figure 23:
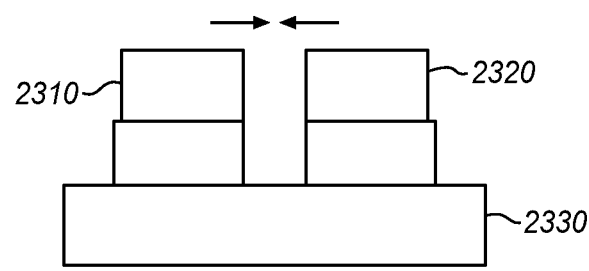
FIGS. 23-29 illustrate fabrication of a preform for a stringer in a further illustrative embodiment.
Figure 24:
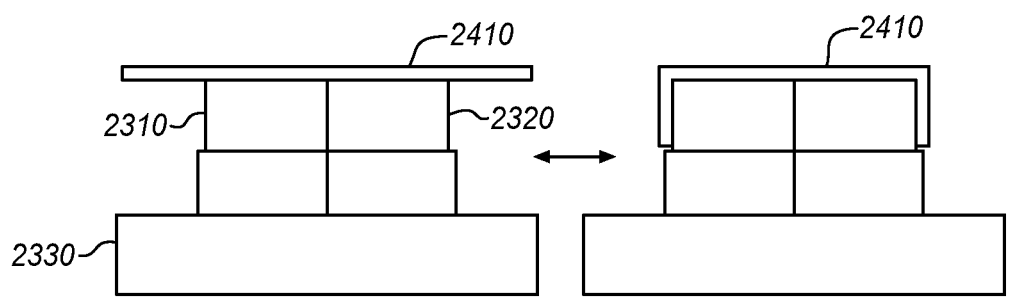
Figure 25:
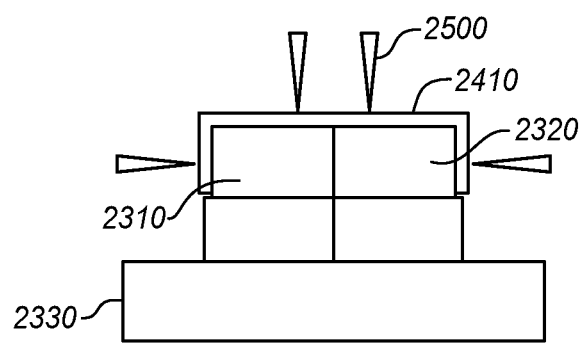
Figure 26:
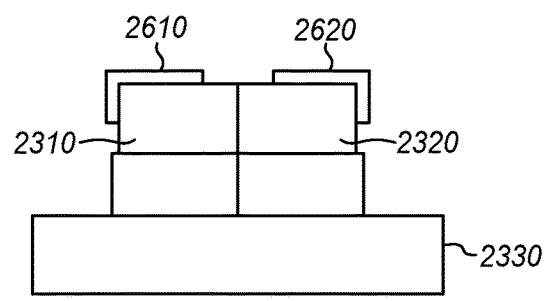
Figure 27:
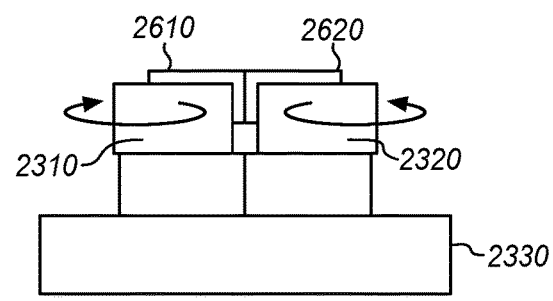
Figure 28:
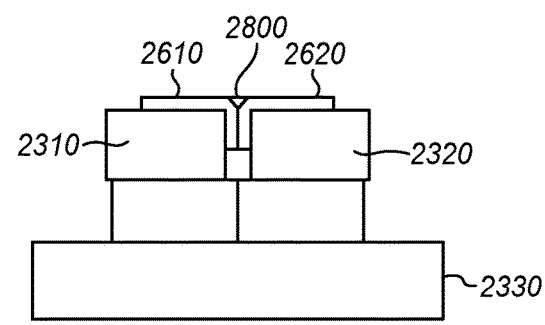
Figure 29:
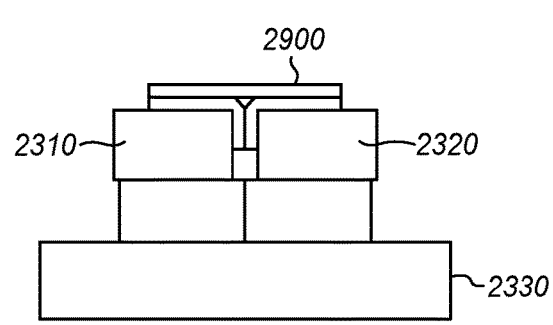

FIGS. 23-29 illustrate fabrication of a preform for a stringer in a further illustrative embodiment. In FIG. 23, a mandrel 2310 and a mandrel 2320 are brought together atop a tool 2330. In FIG. 24, a preform 2410 is laid-up. The preform 2410 is shaped against the mandrels by a PBP machine. In FIG. 25, cutters 2500 trim the preform 2410 to remove excess material from the mandrels, and in FIG. 26 the operations of the cutters 2500 have caused the preform 2410 to be divided into a preform 2610 and a preform 2620. In FIG. 27, mandrels 2310 and 2320 are rotated to bring vertical portions of the preform 2610 and the preform 2620 into contact. A gap filler 2800 is placed into a radial gap between the preform 2610 and the preform 2620 in FIG. 28, and a cap 2900 is placed atop the gap filler 2800 to form a completed preform for a stringer in FIG. 29.

FIGS. 30-36 illustrate fabrication of a preform for a stringer in a further illustrative embodiment. In this embodiment, mandrel 3010 and mandrel 3020 of FIG. 30 are brought together atop base 3030, and in FIG. 31, a preform 3100 is laid-up atop the mandrels, mandrel 3010 and mandrel 3020, and shaped against the mandrels, mandrel 3010 and mandrel 3020, by a PBP machine. In FIG. 32, cutters 3200 remove excess material from the preform 3100, and divide the preform 3100 into a first preform 3310 and a second preform 3320 of FIG. 33. In FIG. 34, the mandrel 3010 and the mandrel 3020 are rotated, and in FIG. 35 vertical portions of the first preform 3310 and second preform 3320 are brought together. A gap filler 3500 is placed into a radial gap between the first preform 3310 and the second preform 3320 in FIG. 35, and a cap 3600 is placed atop the gap filler 3500 to form a completed preform for a stringer in FIG. 36.

FIGS. 37-43 illustrate fabrication of a preform for a stringer in a further illustrative embodiment. In this embodiment, mandrel 3710 and mandrel 3720 are disposed atop a tool 3730 as shown in FIG. 37. In FIG. 38, a temporary mandrel 3830 is inserted between the mandrel 3710 and the mandrel 3720, and first preform 3810 and second preform 3820 are laid-up. The temporary mandrel 3830 is removed, and, as shown in FIG. 38A, the first preform 3810 and second preform 3820 are shaped against the mandrels, mandrel 3710 and mandrel 3720, respectively, by a PBP machine. Alternatively, as illustrated in FIG. 38A, first preform 3810 and second preform 3820 (either mounted together on tool 3730 or separately on tools 3730a and 3730b, not shown) are laid-up and shaped against the mandrels 3710 and 3720, respectively, by a PBP machine, without the use of temporary mandrel 3830. In FIG. 39, cutters 3900 trim the first preform 3810 and second preform 3820, reducing a size of the preforms as shown in FIG. 40. In FIG. 41, the mandrels, mandrel 3710 and mandrel 3720, are driven together, bringing vertical portions of the first preform 3810 and second preform 3820 into contact. A gap filler 4200 is placed into a radial gap between the first preform 3810 and the second preform 3820 in FIG. 42, and a cap layer 4300 is placed atop the gap filler 4200 in FIG. 43 to form a completed preform for a stringer.

FIGS. 44-50 illustrate fabrication of a preform for a stringer in a further illustrative embodiment. In FIG. 44, an angular mandrel 4410 and an angular mandrel 4420 are disposed atop a tool 4430. First preform 4510 and second preform 4520 are laid-up atop the angular mandrels and shaped in FIG. 45 (e.g., by a PBP machine). In FIG. 46, cutters 4600 trim and remove excess material from the first preform 4510 and second preform 4520. FIG. 47 illustrates the first preform 4510 and second preform 4520 after they have been trimmed. In FIG. 48, the angular mandrels 4410 and 4420 are rotated and moved towards each other, until vertical portions of the first preform 4510 and second preform 4520 are placed into contact. In FIG. 49, a gap filler 4900 is placed into a radial gap between the first preform 4910 and the second preform 4920. In FIG. 50, a cap 5000 is placed atop the gap filler 4900 to form a completed preform for a stringer.

Figure 51:
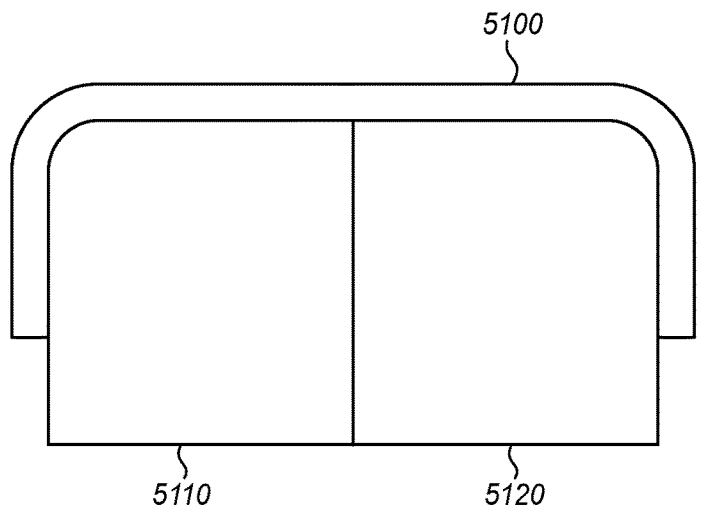
FIG. 51 depicts mandrels for fabricating a preform in the shape of a C-channel in an illustrative embodiment.
Figure 52:
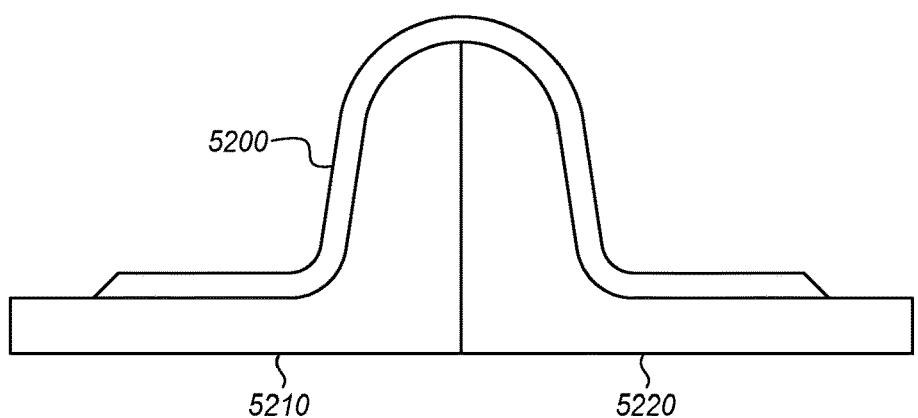
FIG. 52 illustrates mandrels for fabricating a preform for a rounded hat stringer in an illustrative embodiment.
Figure 53:
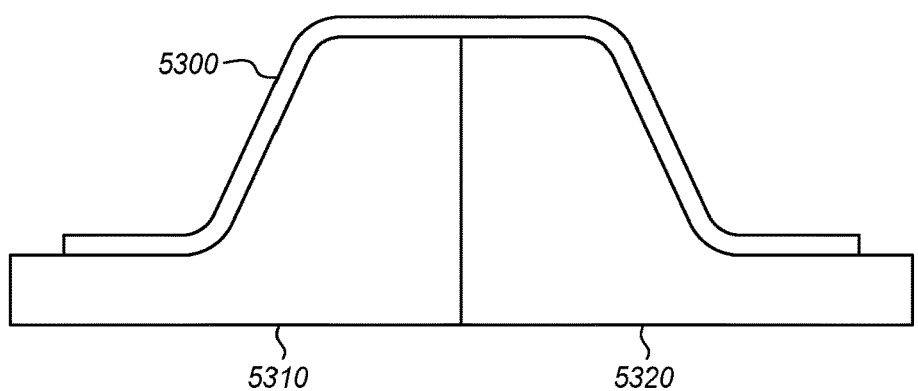
FIG. 53 illustrates mandrels for fabricating a preform for a trapezoidal hat stringer in an illustrative embodiment.

In further embodiments, stringers of any suitable cross-section and/or size are fabricated by swapping the mandrels depicted in the FIGS. above with other mandrels having different cross-sectional shapes and/or lengths. Illustrative examples of cross-sectional shapes include portions of curved hat stringers, trapezoidal had stringers, C-channels, Z-channels, I-shaped channels, and others. For example, FIG. 51 illustrates mandrels 5110 and 5120 for fabricating a preform 5100 in the shape of a C-channel, FIG. 52 illustrates mandrels 5210 and 5220 for fabricating a preform 5200 for a rounded hat stringer, and FIG. 53 illustrates mandrels 5310 and 5320 for fabricating a preform 5300 for a trapezoidal hat stringer.

Figure 54:
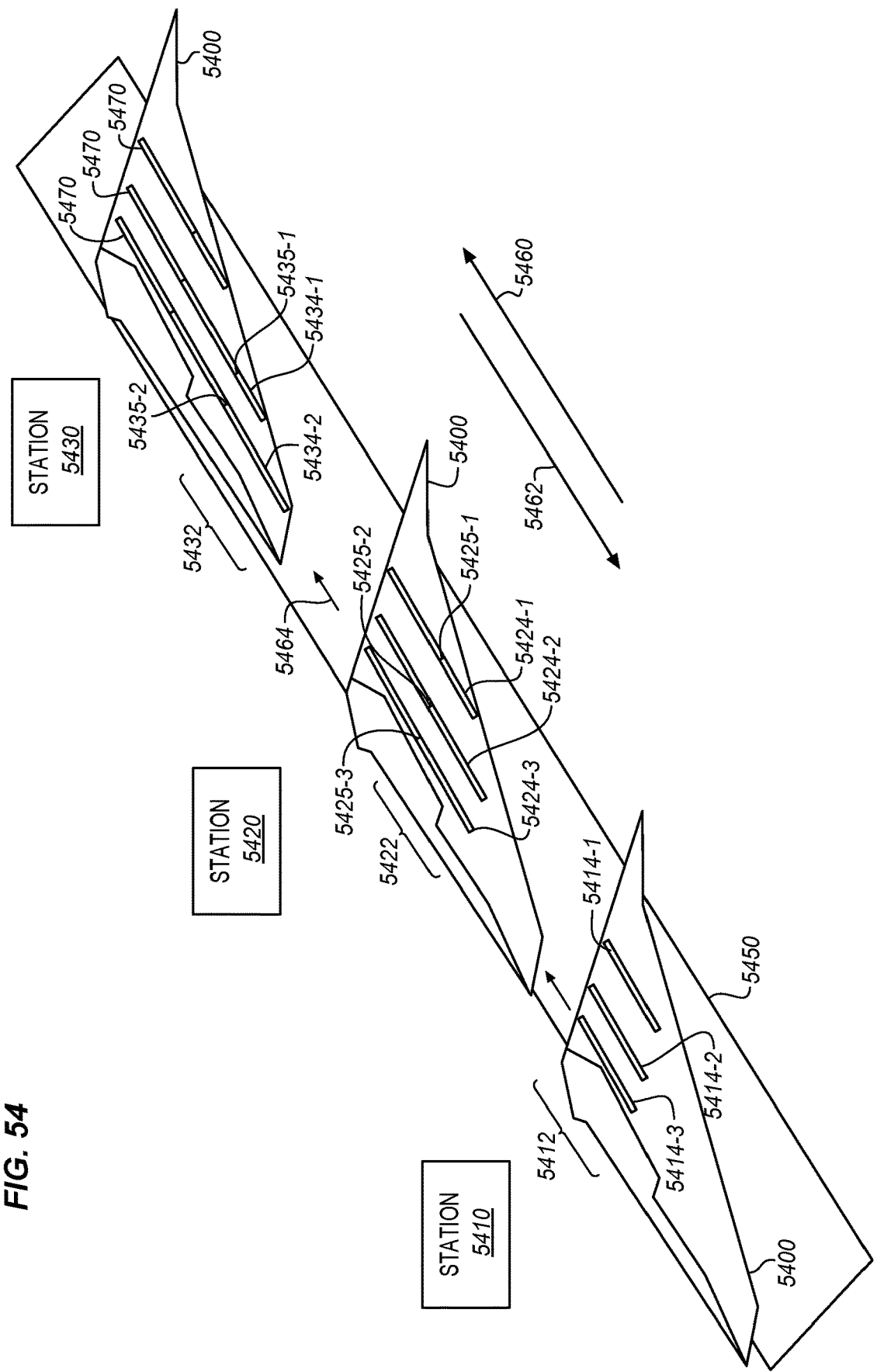
FIG. 54 illustrates an arrangement wherein stations place preforms at portions of a wing panel preform that are separated from inboard to outboard in an illustrative embodiment.
Figure 55:
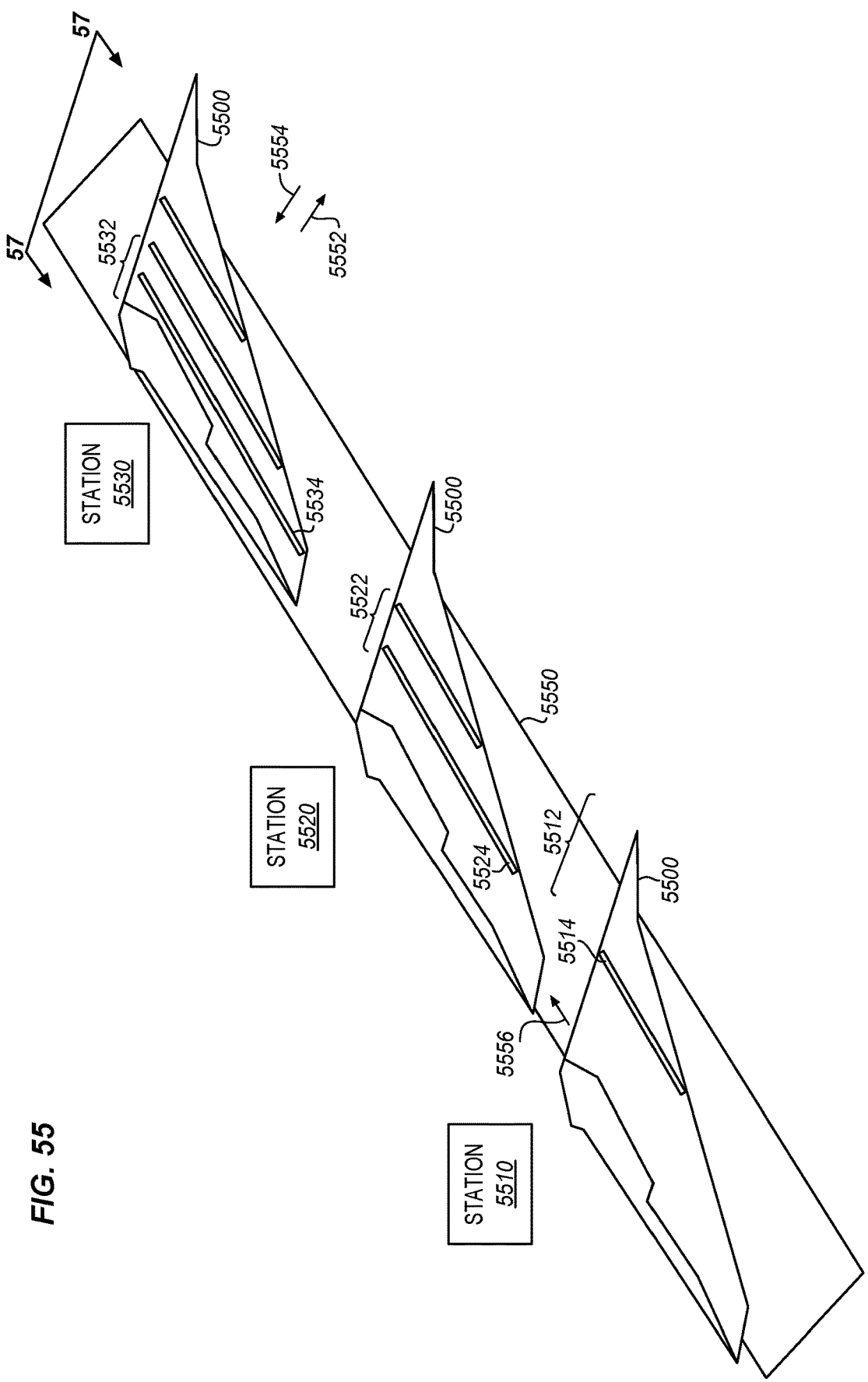
FIGS. 55, 55A, and 55B illustrate arrangements wherein stations operate to place stringer preforms upon a wing panel preform in illustrative embodiments.
Figure 55A:
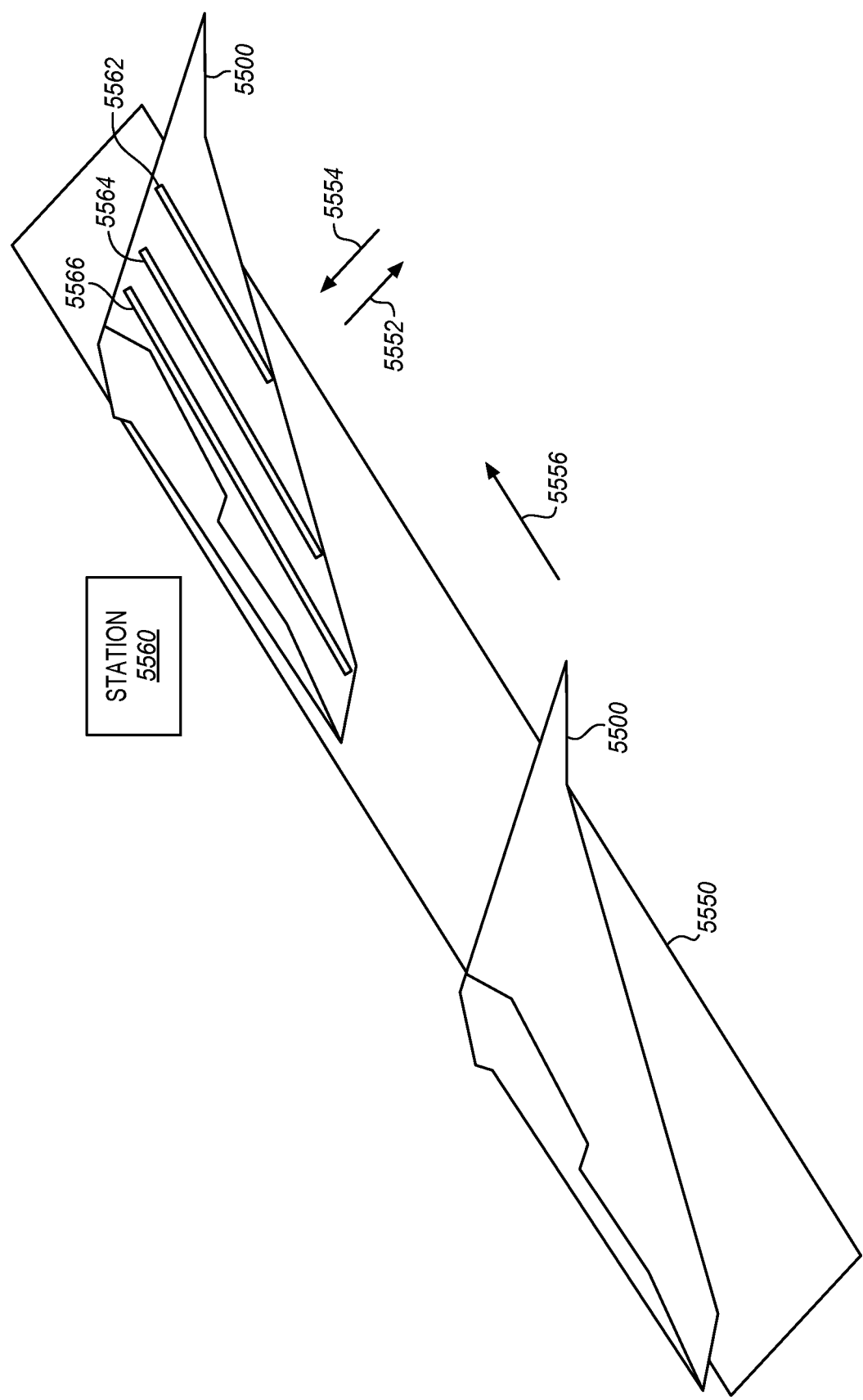
Figure 55B:
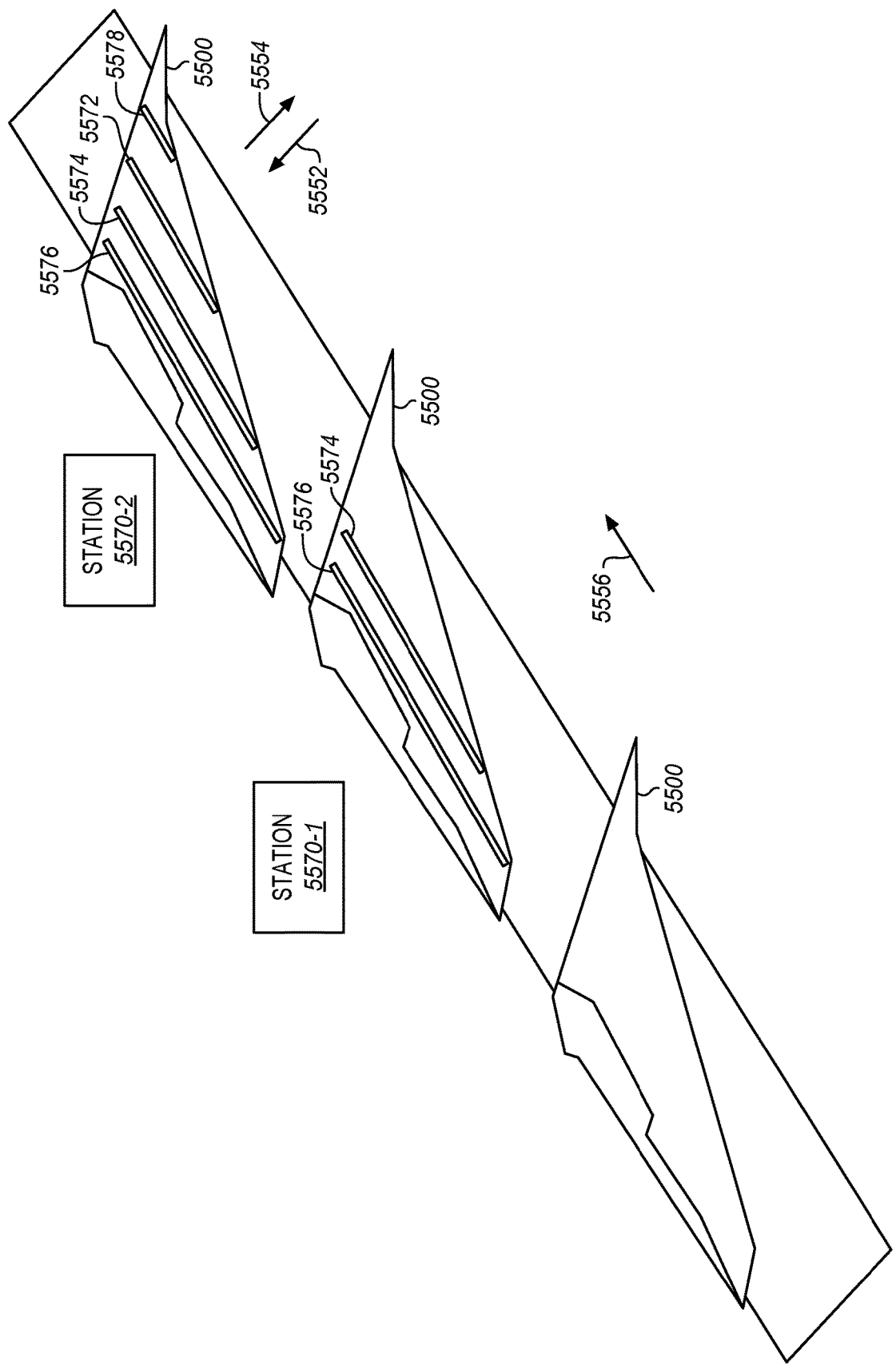

FIG. 54, FIG. 55, and FIG. 55B illustrate arrangements for stations to place preforms onto a wing panel preform. The wing panel preform is advanced in a process direction. A first stringer preform is applied to the wing panel preform at a first station. The wing panel preform with the first stringer preform is further advanced in the process direction. The second stringer preform is applied to the wing panel preform at a second station.

FIG. 54 illustrates an arrangement wherein stations 5410, 5420, and 5430 place preforms at portions 5412, 5422, and 5432 of a wing panel preform 5400 that are separated from inboard 5460 to outboard 5462. This results in wing panel preform 5400 having stringer preforms 5470 assembled from stringer preform sections 5414-1 through 5414-3 (e.g., preforms for blade stringers or preforms for hat stringers) placed by station 5410, stringer preform sections 5424-1 through 5424-3 placed by station 5420, and stringer preform sections 5434-1 through 5434-2 placed by station 5430. The preforms that form different lengthwise portions of a stringer preform 5470 may be integrated together via any suitable splicing techniques, such as scarf joints, lap splices, butt splices, or step lap splices, such as splices 5425-1 through 5425-3 which unite stringer preform sections 5424-1 through 5424-3 with stringer preform sections 5414-1 through 5414-3, or splices 5435-1 and 5435-2, which unite stringer preforms sections 5424-2 and 5424-3 with stringer preform sections 5434-1 and 5434-2. This segmented approach lends itself to micro-pulsed or continuous environments fabrication environments, as each segmented set of stringer preforms 5470 can be added at a series of stations 5410, 5420, and 5430 as the wing panel preform 5400 is advanced across the stations 5410, 5420, and 5430. In this embodiment, the wing panel preform 5400 is advanced (e.g., pulsed or continuously moved) along a track 5450 in a process direction 5464, and the stations 5410, 5420, and 5430 apply stringer preform sections or stringer preforms during continuous motion or during pauses between pulses of the wing panel preform 5400. In one embodiment, the track 5450 is configured to advance the wing panel preform 5400 in the process direction 5464 across the stations 5410, 5420, and 5430.

In this illustrative example, the wing panel preform 5400 is advanced in a process direction 5464. First stringer preform sections 5414-1 through 5414-3 are applied to the wing panel preform 5400 at a first station, station 5410. The wing panel preform 5400 with the first stringer preform sections 5414-1 through 5414-3 is advanced further in the process direction 5464. Second stringer preform sections 5424-1 through 5424-3 are applied to the wing panel preform 5400 at a second station, station 5420. The wing panel preform 5400 with the first stringer preform sections 5414-1 through 5414-3 and second stringer preform sections 5424-1 through 5424-3 is advanced further in the process direction 5464. Third stringer preform sections 5434-1 through 5434-3 are applied to the wing panel preform 5400 at a third station, station 5430. In some illustrative examples, the first stringer preform sections 5414-1 through 5414-3, the second stringer preform sections 5424-1 through 5424-3, and the third stringer preform sections 5434-1 through 5434-3 are spliced together span-wise across the wing panel preform 5400 to form the stringer preforms 5470. In some illustrative examples, applying the first stringer preform sections 5414-1 through 5414-3 further comprises placing the first stringer preform sections 5414-1 through 5414-3 chord-wise across the wing panel preform 5400.

In one embodiment, stringer preforms or stringer preform sections are placed together (en masse) at each station. Therefore, all of various stringer preform sections 5414-1 through 5414-3, 5424-1 through 5424-3, and 5434-1 through 5434-2 may be placed at once or in groups of two or more. In order to perform this operation on the contoured surface of the wing panel preform 5400, blades of blade stringers (e.g., blades 5722 of stringer preforms 5720 of FIG. 57) are arranged to be parallel to blades of adjacent blade stringers. The configurations covered in FIGS. 15-22 and FIGS. 26-50 allow fabrication of blade stringers (e.g., stringers 5720 of FIG. 57) where the blade (e.g., blade 5722 of FIG. 57) is parallel to an adjacent stringer even though the contour of the wing panel on which it is placed is not parallel. The parallel blade arrangement is beneficial for mass application of stringers from a fore to aft application situation. The parallel blades allow application en masse and it can be accomplished with a tooling that has reduced complexity than would otherwise be needed for mass application of non-parallel stringers. However, the parallel blade configuration may not be foregone for arrangements of FIG. 55 wherein one full length stringer preform is applied at a time.

FIG. 55 illustrates an arrangement wherein stations 5510, 5520, and 5530 operate to place stringer preforms 5514, 5524, and 5534 upon a wing panel preform 5500 at portions 5512, 5522, and 5532 of the wing panel preform 5500 that are separated from fore 5552 to aft 5554. FIG. 55 illustrates an example in which applying the stringer preforms 5514, 5524, and 5534 to the wing panel preform 5500 comprises the series of stations 5510, 5520, and 5530 applying the stringer preforms 5514, 5524, and 5534 to the wing panel preform 5500 in a progressively chord-wise fore 5552 or aft 5554 direction. This results in the wing panel preform 5500 having stringer preforms 5514, 5524, and 5534. In one embodiment, the stringer preforms 5514, 5524, and 5534 are assembled from stringer preform sections 5414-1 through 5414-3, 5424-1 through 5424-3, and 5434-1 through 5434-2 of FIG. 54 (e.g., preforms for blade stringers, preforms for hat stringers). In this embodiment, stringer preform 5514 is placed by station 5510, stringer preform 5524 is placed by station 5520, and stringer preform 5534 is placed by station 5530. This segmented approach lends itself to pulsed or continuous fabrication environments. Furthermore, in embodiments where the stringer preforms 5514, 5524, and 5534 are each spliced from segments, each of the stringer preform 5514, 5524, and 5534 can be spliced together from stringer preform sections (e.g., stringer preform sections 5414-1 through 5414-3, 5424-1 through 5424-3, and 5434-1 through 5434-2 of FIG. 54) at a series of stations 5510, 5520, and 5530 for applying stringer preforms. In this manner, a first stringer preform section 5414-1 is spliced to a second stringer preform section 5424-1 upon the wing panel preform 5500. This results in a chord-wise arrangement of first stringer preform sections 5414-1 through 5414-3, and chord-wise arrangement of splices 5425-1 through 5425-3 between the first stringer preform sections 5414-1 through 5414-3 and second stringer preform sections 5424-1 through 5424-3.

In this embodiment, the wing panel preform 5500 is advanced (e.g., pulsed or continuously moved) along a track 5550 in a process direction 5556, and the stations 5510, 5520, and 5530 apply stringer preforms 5514, 5524, and 5534, or stringer preform segments (e.g., stringer preform sections 5414-1 through 5414-3, 5424-1 through 5424-3, and 5434-1 through 5434-2 of FIG. 54) during continuous motion or during pauses of the wing panel preform 5500. In one embodiment, the track 5550 is configured to advance the wing panel preform 5500 in the process direction 5556 across the stations 5510, 5520, and 5530.

FIG. 55A illustrates an arrangement wherein station 5560 operates to place multiple stringer preforms 5562, 5564, and 5566 in whole (e.g., all stringer preforms are applied together, en masse via a single station) upon a wing panel preform 5500. The stringer preforms 5562, 5564, and 5566 may comprise preforms for blade stringers, or preforms for hat stringers. In one embodiment, the stringer preforms 5562, 5564, and 5566 are assembled from the stringer preform sections 5414-1 through 5414-3, 5424-1 through 5424-3, and 5434-1 through 5434-2 of FIG. 54. This approach of placing all stringer preforms 5562, 5564, and 5566 at once may be performed during a single pause between pulses, or as part of a continuous fabrication process. Furthermore, in embodiments where the stringer preforms 5514, 5524, and 5534 are each spliced from segments, each of the stringer preforms 5514, 5524, and 5534 can spliced together from stringer preform sections (e.g., stringer preform sections 5414-1 through 5414-3, 5424-1 through 5424-3, and 5434-1 through 5434-2 of FIG. 54).

In this embodiment, the wing panel preform 5500 is advanced (e.g., pulsed or continuously moved) along a track 5550 in a process direction 5556. In a further embodiment, the track 5550 is configured to advance the wing panel preform 5500 in the process direction 5556 across the stations 5560.

FIG. 55B illustrates an arrangement wherein stations 5570-1 and 5570-2 operates to place multiple stringer preforms 5572, 5574, 5576, and 5578 in whole upon a wing panel preform 5500. FIG. 55B distinguishes from FIG. 55A in that multiple stringer preforms, but not all stringer preforms for a wing panel preform 5500, are placed together by a single station. Specifically, adjacent stringer preforms 5576 and 5574 are placed by station 5570-1, and adjacent stringer preforms 5572 and 5578 are placed by station 5570-2. As depicted, stringer preform 5576 is applied as part of a batch of stringer preforms 5576 and 5574 placed on wing panel preform 5500 in a single batch placement. In some illustrative examples, the batch of stringer preforms 5576 and 5574 is placed upon wing panel preform 5500 with blades of the batch of string preforms held in parallel. However, in further embodiments disparate stringer preforms that are not adjacent are placed via the same station.

The stringer preforms 5572, 5574, 5576, and 5578 may comprise preforms for blade stringers, or preforms for hat stringers. In one embodiment, the stringer preforms 5572, 5574, 5576, and 5578 are assembled from the stringer preform sections 5414-1 through 5414-3, 5424-1 through 5424-3, and 5434-1 through 5434-2 of FIG. 54. This approach of placing multiple stringer preforms 5572 and 5578 at once may be performed during a single pause between pulses, or as part of a continuous fabrication process. Furthermore, in embodiments where the stringer preforms 5572, 5574, 5576, and 5578 are each spliced from segments, each of the stringer preforms 5572, 5574, 5576, and 5578 can spliced together from stringer preform sections (e.g., stringer preform sections 5414-1 through 5414-3, 5424-1 through 5424-3, and 5434-1 through 5434-2 of FIG. 54).

In this embodiment, the wing panel preform 5500 is advanced (e.g., pulsed or continuously moved) along a track 5550 in a process direction 5556. In a further embodiment, the track 5550 is configured to advance the wing panel preform 5500 in the process direction 5556 across the stations 5560.

Figure 56:
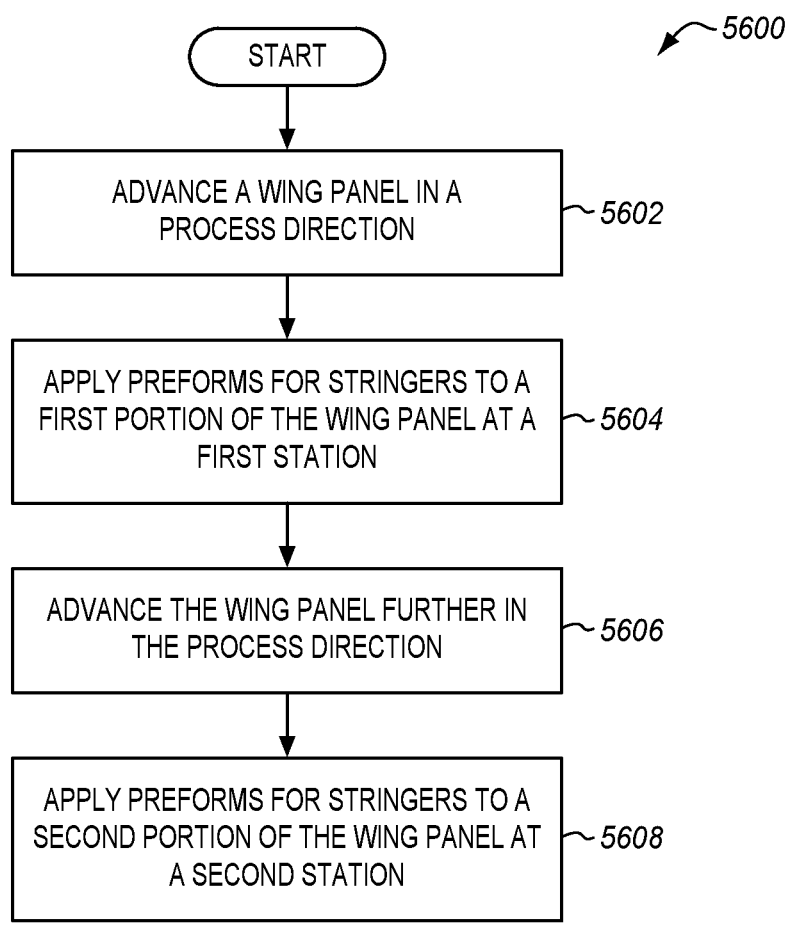
FIGS. 56, 56A, and 56B depict methods for picking and placing stringer preforms in illustrative embodiments.

FIG. 56 depicts a method 5600 for picking and placing stringer preforms (e.g., stringer preforms 5514, 5524, and 5534 of FIG. 55) in an illustrative embodiment. Method 5600 includes advancing a wing panel preform 5500 in a process direction 5556 in step 5602, applying stringer preform sections (e.g., stringer preform sections 5414-1 through 5414-3 of FIG. 54) to a first portion 5512 of the wing panel preform 5500 at a first station 5510 in step 5604, advancing the wing panel preform 5500 further in the process direction 5556 in step 5606, and applying stringer preform sections (e.g., stringer preform sections 5424-1 through 5424-3 of FIG. 54) to a second portion 5522 of the wing panel preform 5500 at a second station 5520 in step 5608. Further advancing the wing panel preform 5500 in the process direction 5556 and applying additional stringer preform sections to a subsequent portion of the wing panel preform 5500 may be required (e.g., repeating steps 5606 and 5608) until all stringer preform sections have been applied.

Figure 56A:
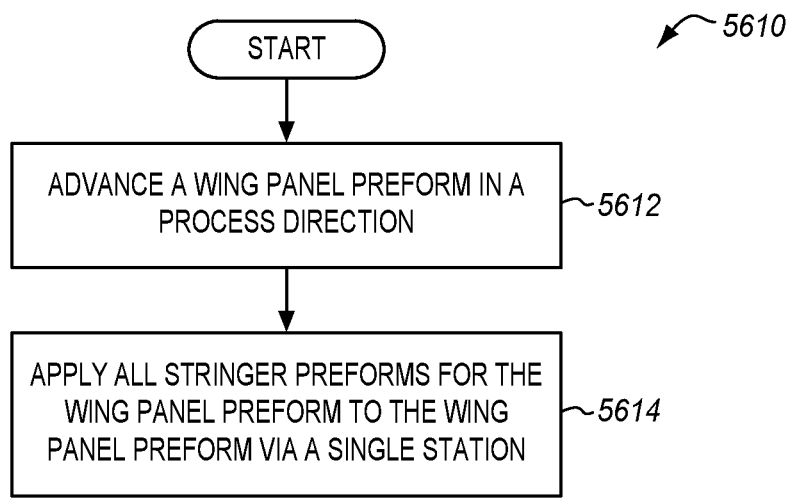

FIG. 56A depicts a method 5610 for picking and placing stringer preforms (e.g., stringer preforms 5562, 5564, and 5566 of FIG. 55A) in an illustrative embodiment. Method 5610 includes advancing a wing panel preform 5500 in a process direction 5556 in step 5612. Method 5610 further includes applying all stringer preforms (e.g., comprising stringer preform sections 5414-1 through 5414-3, 5424-1 through 5424-3, and 5434-1 through 5434-2 of FIG. 54) for the wing panel preform 5500 to the wing panel preform 5500 via a single station 5560, in step 5614.

Figure 56B:
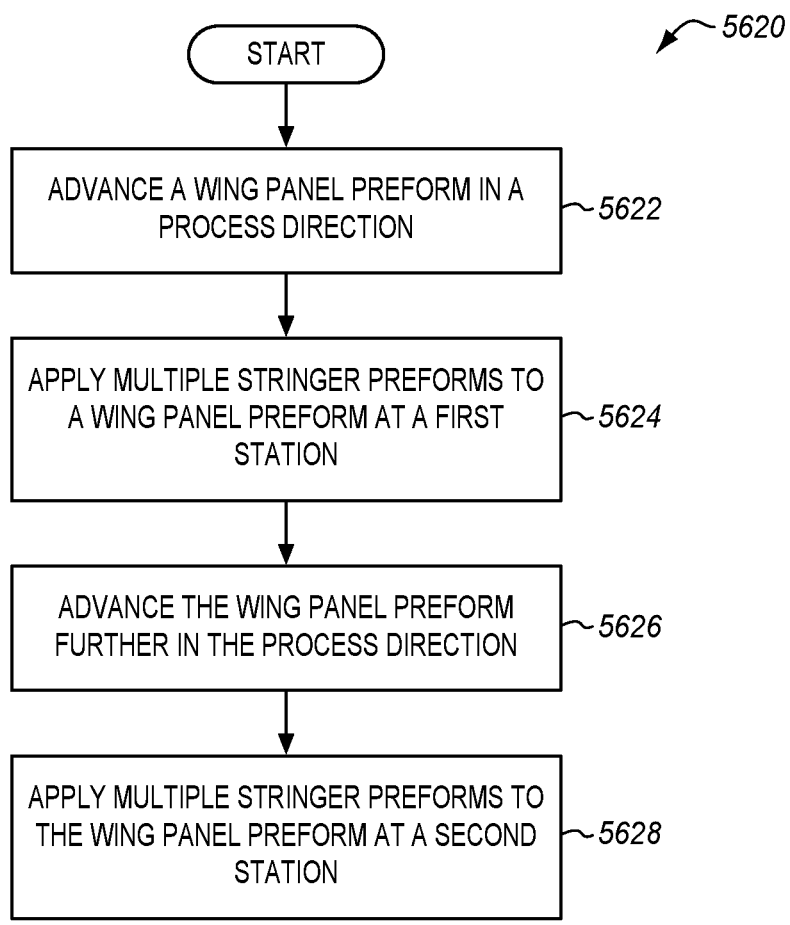

FIG. 56B depicts a method 5620 for picking and placing stringer preforms (e.g., stringer preforms 5572, 5574, 5576, and 5578 of FIG. 55B) in an illustrative embodiment. Method 5620 includes advancing a wing panel preform 5500 in a process direction 5556 in step 5622, applying multiple stringer preforms 5574 and 5576 (e.g., comprising stringer preform sections 5414-1 through 5414-3, 5424-1 through 5424-3, and 5434-1 through 5434-2 of FIG. 54) to the wing panel preform 5500 at a first station 5570-1 in step 5624, advancing the wing panel preform 5500 further in the process direction 5556 in step 5626, and applying multiple stringer preform sections 5572 and 5578 (e.g., comprising stringer preform sections 5414-1 through 5414-3, 5424-1 through 5424-3, and 5434-1 through 5434-2 of FIG. 54) the wing panel preform 5500 at a second station 5570-2 in step 5628. Further advancing the wing panel preform 5500 in the process direction 5556 and applying additional stringer preform sections to a subsequent portion of the wing panel preform 5500 may be required (e.g., repeating steps 5626 and 5628) until all stringer preform sections have been applied.

Figure 57:
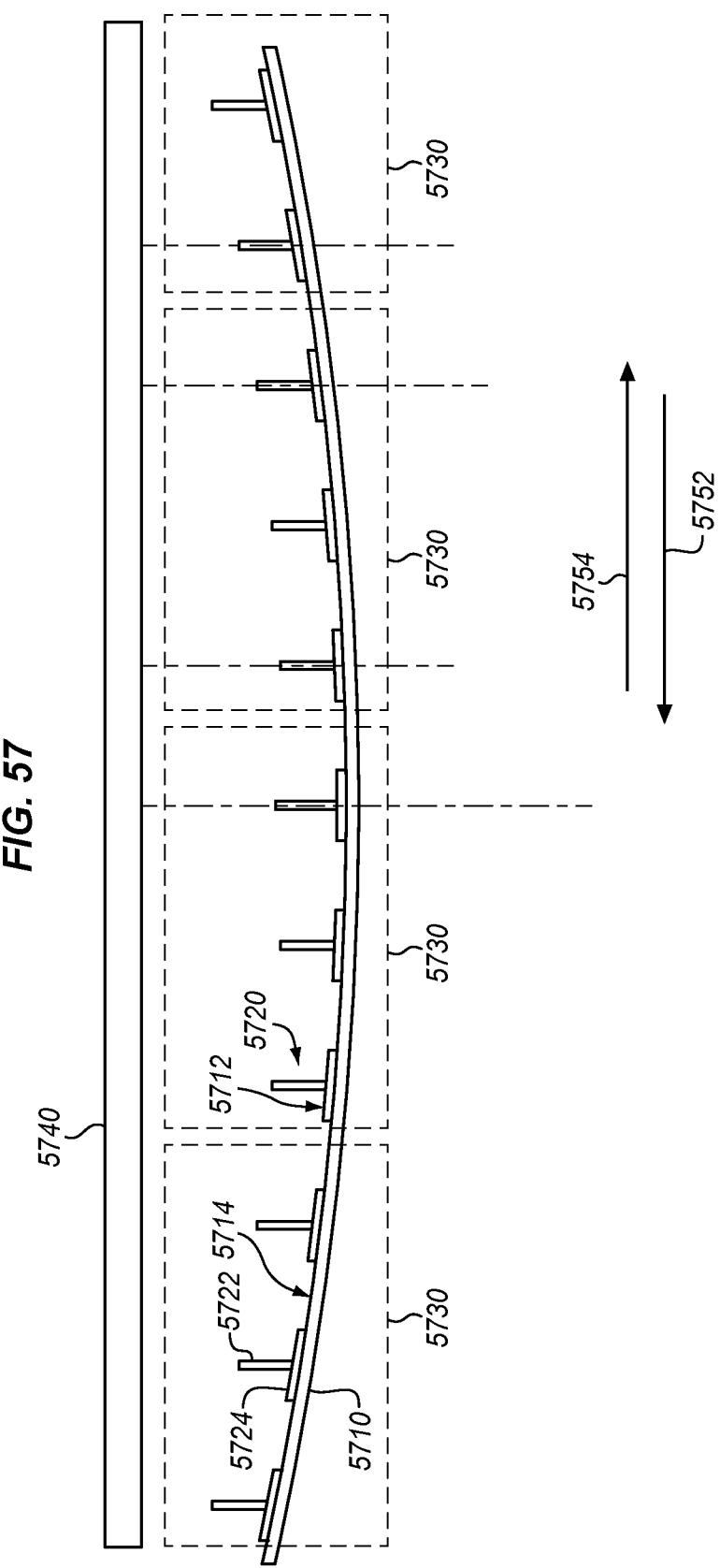
FIG. 57 is an end view illustrating placement of batches of stringer preforms at once in an illustrative embodiment.

FIG. 57 is an end illustrating placement of batches of stringer preforms at once in an illustrative embodiment, and corresponds with view arrows 57 of FIG. 55. While eleven stringers are shown in this cross section and only three or four are shown in FIGS. 54, 55, 55A and 55B, more stringers may be part of an actual wing panel configuration.

In FIG. 57, stringer preforms 5720 are arranged along a wing panel preform 5710. FIG. 57 therefore illustrates another possible embodiment different from FIG. 55B in that batches are applied by one station. Each stringer preform 5720 includes flanges 5724, and the angle of flanges 5724 may vary between different stringer preforms in order to accommodate a geometry of the wing panel preform. The flanges are complementary to the contour 5714 of the wing panel preform 5710 where applied, and the contour 5712 of different stringer preforms 5720 across the wing panel preform 5710 is not constant. However, the angle of blades 5722 (also referred to as "webs") of each stringer preform 5720 are uniform between stringer preforms (e.g., vertical), and hence are parallel with each other. In one embodiment, the angle of blades 5722 is parallel across the stringer preforms 5720 and enhances the ease with which multiple stringer preforms 5720 can be picked up and placed at once via a strong back 5740. This constant, uniform angle of blades 5722 across the stringer preforms 5720 enhances the ease with which multiple stringer preforms 5720 can be picked up and placed at once via a strong back 5740.

The vertically aligned blades 5722 can be quickly coupled to placement tooling in batches 5730 for quick and accurate placement. Thus, in one embodiment, a single strong back 5740 carries a first batch of batches 5730 of stringer preforms 5720 for simultaneous application to the wing panel preform 5710, a single strong back 5740 carries a second batch of batches 5730 of stringer preforms 5720 for simultaneous application, to the wing panel preform 5710, and so on along the width of the wing panel preform 5710 from fore 5754 to aft 5752. This technique provides a benefit by enhancing the speed and ease of fabrication processes pertaining to assembly of wing panel preforms 5710.

Figure 58:
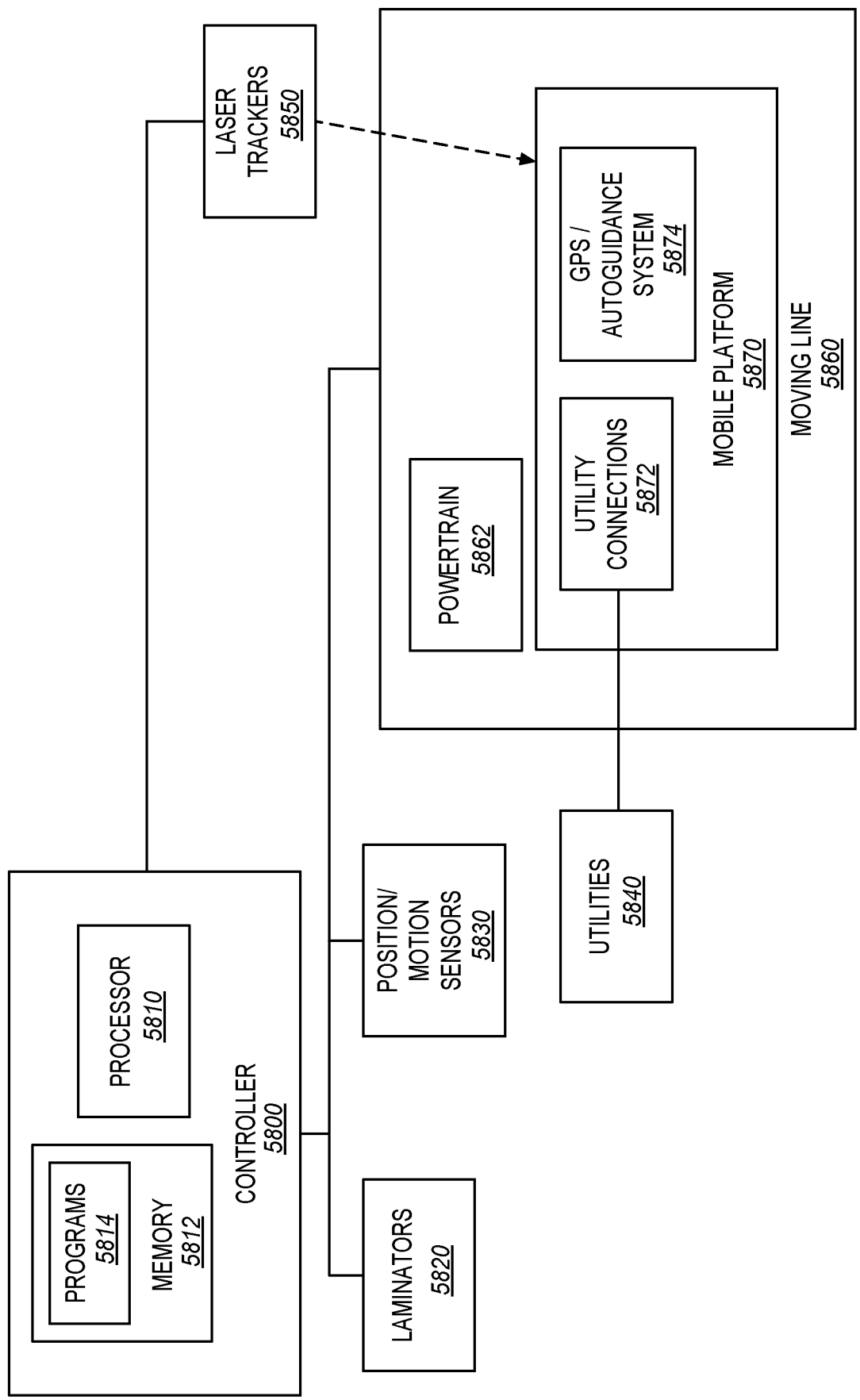
FIG. 58 broadly illustrates control components of a production system of a continuous fabrication line in an illustrative embodiment.

Attention is now directed to FIG. 58, which broadly illustrates control components of a production system of a continuous fabrication line. A controller 5800 coordinates and controls operation of laminators 5820 and movement of one or more mobile platforms 5870, such as to carry the wing panel preform 5400, along a moving line 5860 having a powertrain 5862. The controller 5800 may comprise a processor 5810 which is coupled with a memory 5812 that stores programs 5814. In one example, the mobile platforms 5870 are driven along a moving line 5860 that is driven continuously by the powertrain 5862, which is controlled by the controller 5800. In this example, the mobile platform 5870 includes utility connections 5872 which may include electrical, pneumatic and/or hydraulic quick disconnects that couple the mobile platform 5870 with externally sourced utilities 5840. In other examples, as previously mentioned, the mobile platforms 5870 comprise Automated Guided Vehicles (AGVs) coupled to the mandrel carrying the wing panel preform that include on board utilities, as well as a GPS/Autoguidance system 5874. In still further examples, the movement of the mobile platforms 5870 is controlled using laser trackers 5850. Position and/or motion sensors 5830 coupled with the controller 5800 are used to determine the position of the mobile platforms 5870 as well as the powertrain 5862.

Figure 59:
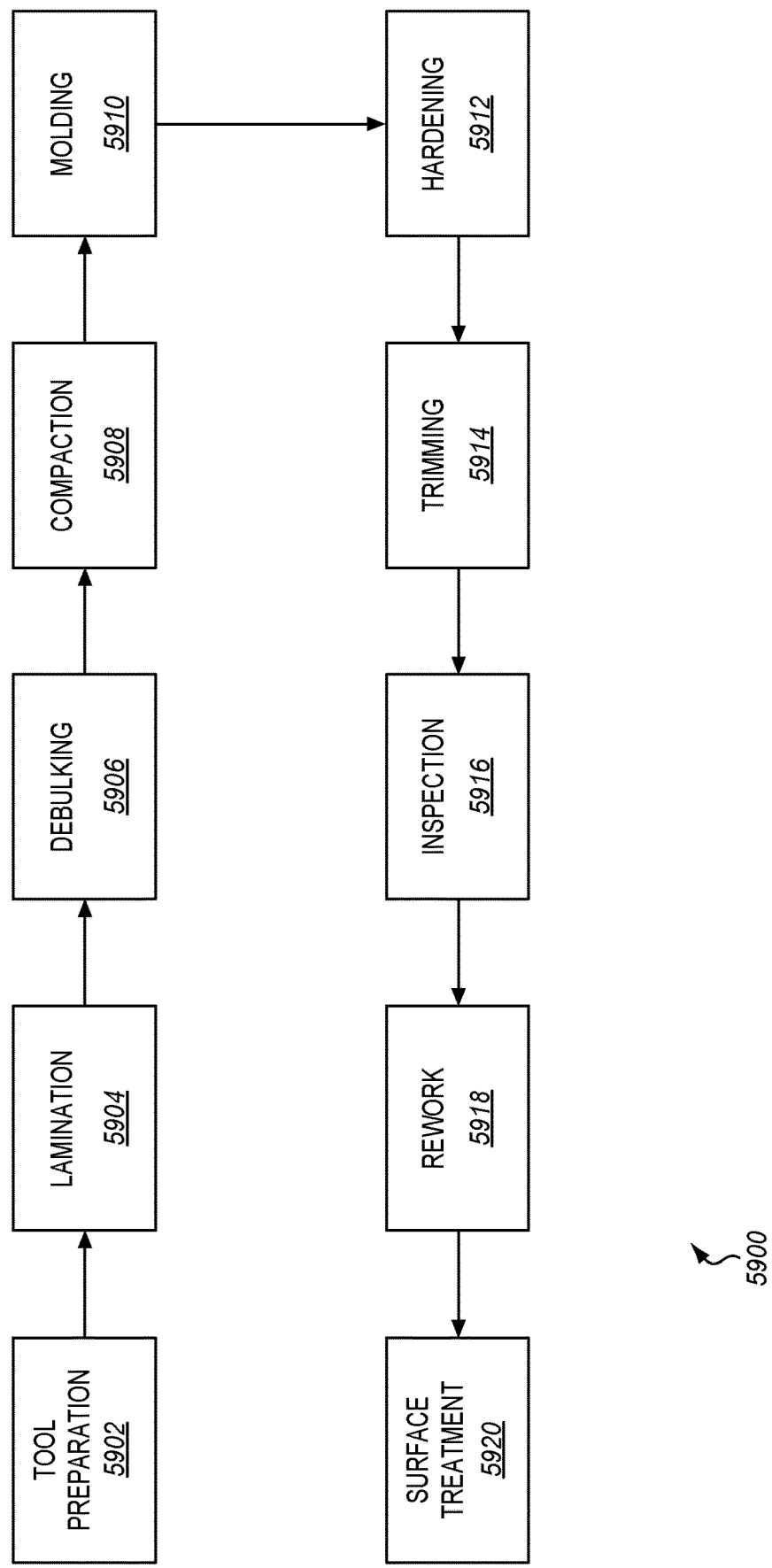
FIG. 59 illustrates an example of a moving line that incorporates a variety of operations that may be required in the production of composite parts in an illustrative embodiment.

Principles of the moving line described above may include other types of operations that are normally performed in the production of composite parts. FIG. 59 illustrates an example of a moving line 5900 that incorporates a variety of operations that may be required in the production of composite parts. For example, the moving line may include a station, zone, or stand for tool preparation 5902 involving cleaning or application of coatings to a tool, following which the tool is transported on a platform to one or locations where lamination 5904 is performed to form a preform. Lamination 5904 may also be referred to as "layup". A fully laid up preform may then be delivered on a moving line to downstream locations where debulking 5906 and compaction 5908 of the preform are performed. Further, the preform may be processed in additional locations where molding 5910, hardening 5912 of the preform into a composite part, trimming 5914, inspection 5916, rework 5918 and/or surface treatment 5920 operations are performed.

Figure 59A:
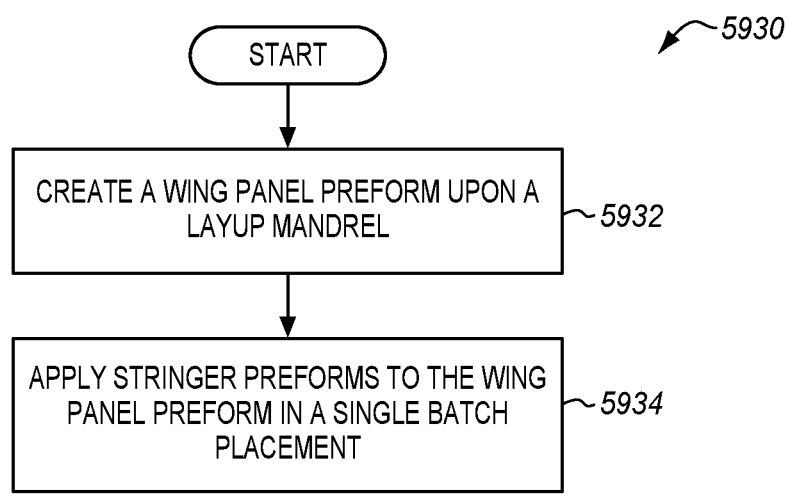
FIGS. 59A-D depict further methods for placing stringer preforms onto a wing panel preform in illustrative embodiments.

FIGS. 59A-59D depict further methods for placing stringer preforms onto a wing panel preform 5500 in illustrative embodiments. Specifically, FIG. 59A depicts a method 5930 for placing a stringer preform upon a wing panel preform 5500. The method 5930 includes creating a wing panel preform 5500 upon a layup mandrel 310 in step 5932, and applying stringer preforms 5562, 5564, and 5566 to the wing panel preform 5500 in a single batch placement in step 5934. In one embodiment, the method further comprises placing the stringer preforms 5562, 5564, and 5566 upon the wing panel preform 5500 with blades 5722 of the stringer preforms 5562, 5564, and 5566 held parallel.

In a further embodiment, the method further includes placing the stringer preforms as stringer preform sections 5414-1 through 5414-3 upon the wing panel preform 5500. In yet another embodiment, the method includes splicing stringer preform sections 5414-1 through 5414-3 and 5424-1 through 5424-3 together upon the wing panel preform 5500 to form the stringer preforms 5562, 5564, and 5566. In one embodiment, the method further comprises placing the stringer preforms 5562, 5564, and 5566 via a Pick-and-Place (PNP) machine 130 upon the wing panel preform 5500.

Figure 59B:
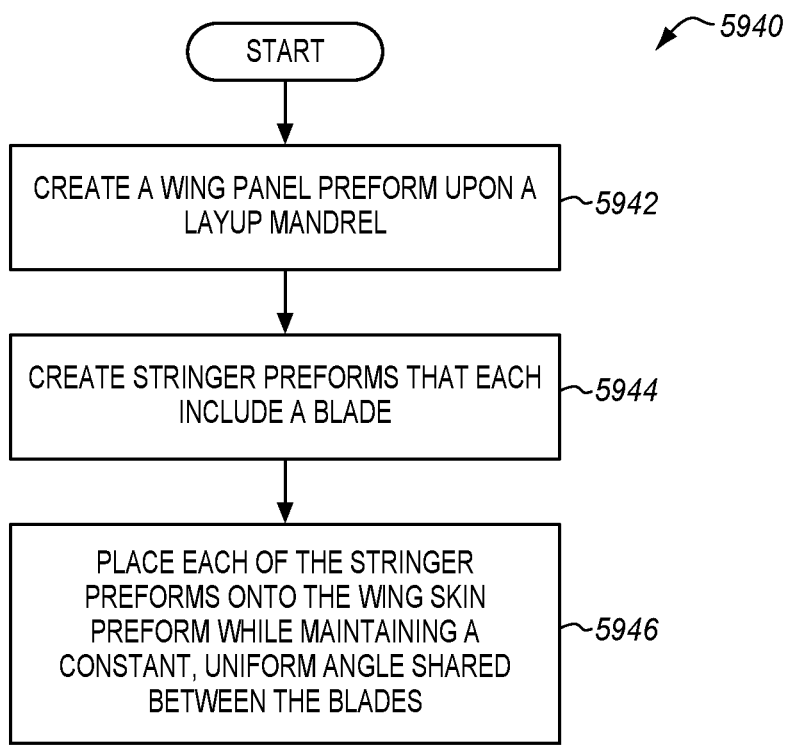

FIG. 59B depicts a method 5940 for placing a stringer preform upon a wing panel preform 5500. The method 5940 includes creating a wing panel preform 5500 upon a layup mandrel in step 5942, creating stringer preforms 5562, 5564, and 5566 that each include a blade 5722 in step 5944, and placing each of the stringer preforms 5562, 5564, and 5566 onto the wing panel preform 5500 while maintaining a constant, uniform angle shared between the blades 5722 in step 5946.

In one embodiment, the method further comprises placing each of the stringer preforms 5562, 5564, and 5566 with blades 5722 of the stringer preforms 5562, 5564, and 5566 held parallel. In another embodiment, the method further includes placing the stringer preforms 5562, 5564, and 5566 chord-wise across the wing panel preform 5500. In yet another embodiment, the method further includes splicing together stringer preform sections 5414-1 through 514-3 and 5424-1 through 5424-3 span-wise across the wing panel preform 5500 to form the stringer preforms 5562, 5564, and 5566. In a further embodiment, the method further includes placing the stringer preforms 5562, 5564, and 5566 using a plurality of stations 5410, 5420, and 5430. In some embodiments, the method further comprises splicing stringer preform sections 5414-1 through 514-3 and 5424-1 through 5424-3 together upon the wing panel preform 5500 to form the stringer preforms 5562, 5564, and 5566.

Figure 59C:
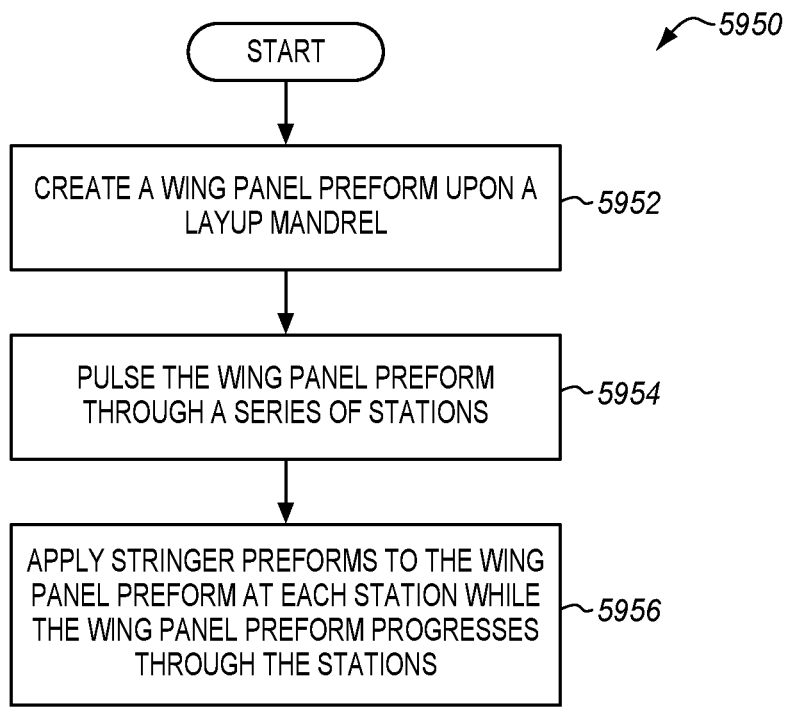

FIG. 59C depicts a method 5950 for placing a stringer preform 5470 upon a wing panel preform 5500. The method includes creating a wing panel preform 5500 upon a layup mandrel in step 5952, pulsing the wing panel preform 5500 through a series of stations in step 5954, and applying stringer preforms 5470 to the wing panel preform 5500 at each station while the wing panel preform 5500 progresses through the stations in step 5956.

In further embodiments, the method comprises, placing each of the stringer preforms 5470 with blades 5722 of the stringer preforms 5470 held parallel, and/or placing the stringer preforms 5470 chord-wise across the wing panel preform 5500. In one embodiment, applying the stringer preforms 5470 comprises applying stringer preform sections 5414-1 through 514-3 and 5424-1 through 5424-3 to the wing panel preform 5400 at the series of stations 5410 and 5420; and splicing together stringer preform sections 5414-1 through 514-3 and 5424-1 through 5424-3 span-wise across the wing panel preform 5500 to form the stringer preforms 5470. In another embodiment, the method further comprises placing multiple stringer preforms 5470 at one time to the wing panel preform 5500, and/or splicing stringer preform sections together upon the wing panel preform 5500.

Figure 59D:
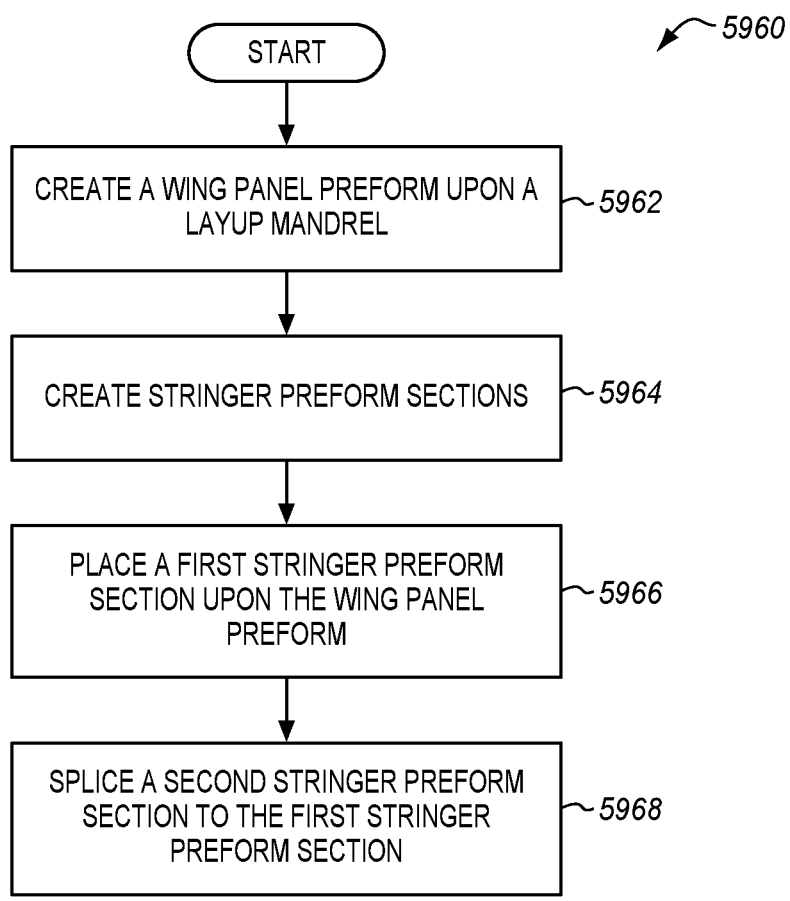

FIG. 59D depicts a method 5960 for splicing stringer preforms 5470. The method includes creating a wing panel preform 5500 upon a layup mandrel in step 5962, creating stringer preform sections in step 5964, placing a first stringer preform section 5414-1 upon the wing panel preform 5500 in step 5966, and splicing a second stringer preform section 5424-1 to the first stringer preform section 5414-1 in step 5968. In one embodiment, the method further comprises placing the second stringer preform section 5424-1 upon the wing panel preform 5500.

In the following examples, additional processes, systems, and methods are described in the context of a fabrication system that creates and applies multi-lane tows for use by a PBP machine.

Figure 60:
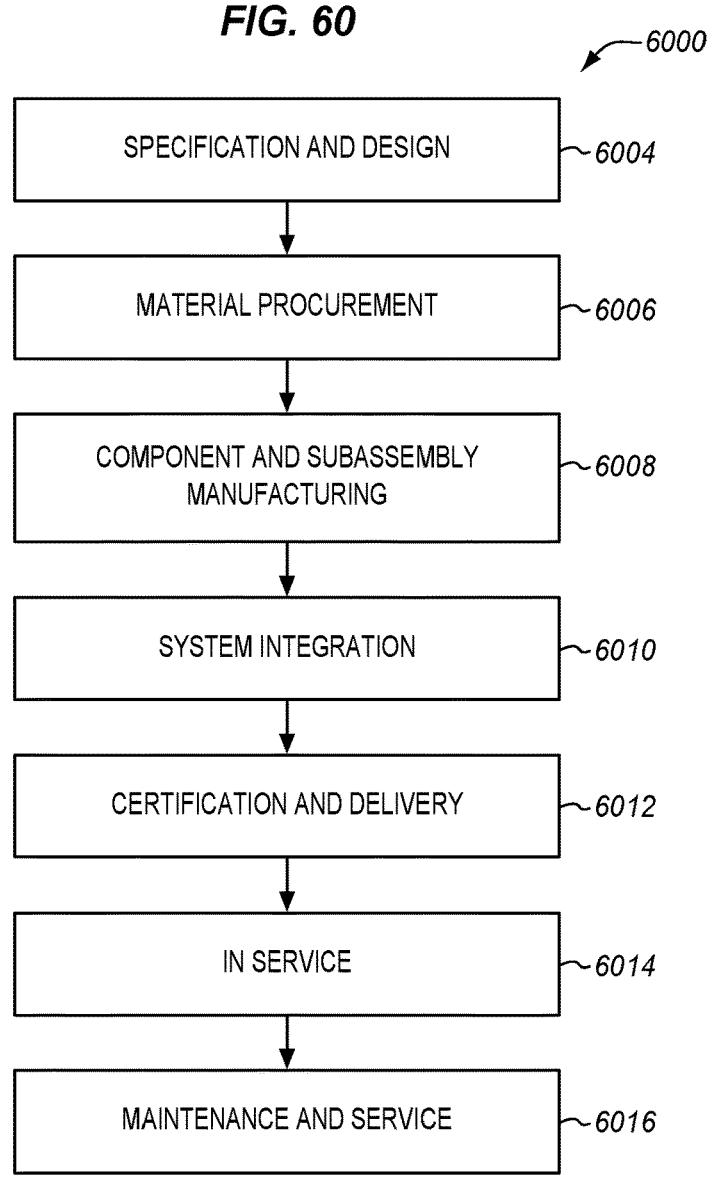
FIG. 60 is a flow diagram of aircraft production and service methodology in an illustrative embodiment.
Figure 61:
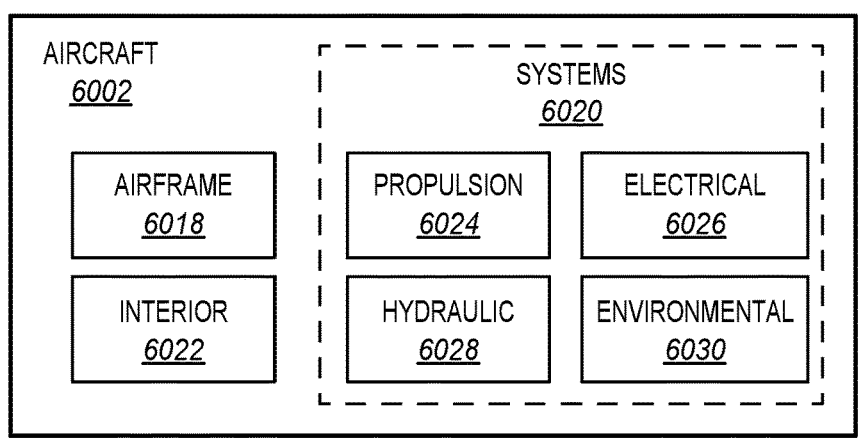
FIG. 61 is a block diagram of an aircraft in an illustrative embodiment.

Referring more particularly to the drawings, embodiments of the disclosure may be described in the context of aircraft manufacturing and service in method 6000 as shown in FIG. 60 and an aircraft 6002 as shown in FIG. 61. During pre-production, method 6000 may include specification and design 6004 of the aircraft 6002 and material procurement 6006. During production, component and subassembly manufacturing 6008 and system integration 6010 of the aircraft 6002 takes place. Thereafter, the aircraft 6002 may go through certification and delivery 6012 in order to be placed in service 6014. While in service by a customer, the aircraft 6002 is scheduled for routine work in maintenance and service 6016 (which may also include modification, reconfiguration, refurbishment, and so on). Apparatus and methods embodied herein may be employed during any one or more suitable stages of the production and service described in method 6000 (e.g., specification and design 6004, material procurement 6006, component and subassembly manufacturing 6008, system integration 6010, certification and delivery 6012, service 6014, maintenance and service 6016) and/or any suitable component of aircraft 6002 (e.g., airframe 6018, systems 6020, interior 6022, propulsion system 6024, electrical system 6026, hydraulic system 6028, environmental system 6030).

Each of the processes of method 6000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 61, the aircraft 6002 produced by method 6000 may include an airframe 6018 with a plurality of systems 6020 and an interior 6022. Examples of systems 6020 include one or more of a propulsion system 6024, an electrical system 6026, a hydraulic system 6028, and an environmental system 6030. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 6000. For example, components or subassemblies corresponding to component and subassembly manufacturing 6008 may be fabricated or manufactured in a manner similar to components or subassemblies produced while the aircraft 6002 is in service. Also, one or more apparatus embodiments, method embodiments, or a combination thereof may be utilized during the subassembly manufacturing 6008 and system integration 6010, for example, by substantially expediting assembly of or reducing the cost of an aircraft 6002. Similarly, one or more of apparatus embodiments, method embodiments, or a combination thereof may be utilized while the aircraft 6002 is in service, for example and without limitation during the maintenance and service 6016. For example, the techniques and systems described herein may be used for material procurement 6006, component and subassembly manufacturing 6008, system integration 6010, service 6014, and/or maintenance and service 6016, and/or may be used for airframe 6018 and/or interior 6022. These techniques and systems may even be utilized for systems 6020, including, for example, propulsion system 6024, electrical system 6026, hydraulic system 6028, and/or environmental system 6030.

In one embodiment, a part comprises a portion of airframe 6018, and is manufactured during component and subassembly manufacturing 6008. The part may then be assembled into an aircraft in system integration 6010, and then be utilized in service 6014 until wear renders the part unusable. Then, in maintenance and service 6016, the part may be discarded and replaced with a newly manufactured part. Inventive components and methods may be utilized throughout component and subassembly manufacturing 6008 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for preparing a preform for hardening into a composite part, the method comprising:
dispensing a first set of lanes, that each comprise a tow of fiber-reinforced material, at a first angle such that the lanes are placed side-by-side with respect to each other, forming a first layer of a multi-lane tow;
applying a film directly in contact with and specifically atop the multi-lane tow, the film configured to resist shear forces applied to the multi-lane tow;
operating a Pick-and-Place (PNP) machine to transport the multi-lane tow and the film together to a mandrel;
compacting the multi-lane tow over the mandrel via a Ply-By-Ply (PBP) machine disposed at the mandrel to form a layer of the preform; and
removing the film from the multi-lane tow after compacting the multi-lane tow via the Ply-By-Ply (PBP) machine.

2. The method of claim 1, wherein:
applying the film comprises placing an engineered surface of the film against the multi-lane tow and pressing the film into place using the Pick-and-Place machine.

3. The method of claim 1, further comprising:
dispensing a second set of lanes at a second angle such that the second set of lanes are placed side-by-side with respect to each other, forming a second layer of the multi-lane tow.

4. The method of claim 3, wherein:
the second layer has a different fiber orientation than the first layer.

5. The method of claim 3, further comprising:
shuttling the multi-lane tow along its length prior to dispensing the second set of lanes.

6. The method of claim 1, further comprising:
repeating the dispensing, applying, transporting, compacting, and removing to increase a size of the preform.

7. The method of claim 1, further comprises:
placing the preform against a second preform; and
placing a gap filler onto the preform at a gap between the preform and the second preform.

8. The method of claim 1, wherein:
each of the lanes is laid-up by a different head of a tape dispensing array.

9. The method of claim 1, further comprising:
trimming the multi-lane tow.

10. The method of claim 1, wherein:
removing the film from the multi-lane tow comprises peeling the film from an end or corner of the film using the Pick-and-Place machine.

11. The method of claim 1, wherein:
dispensing the first set of lanes, that each comprise the tow of fiber-reinforced material, at the first angle such that the lanes are placed side-by-side with respect to each other, forming the first layer of the multi-lane tow further comprises dispensing the first set of lanes on a shuttle.

12. The method of claim 11, wherein:
operating the Pick-and-Place (PNP) machine to transport the multi-lane tow and the film together to the mandrel further comprises operating the Pick-and-Place (PNP) machine to transport the multi-lane tow and the film together from the shuttle to the mandrel.

13. A non-transitory computer readable medium embodying programmed instructions which, when executed by a processor, are operable for performing a method for preparing a preform for hardening into a composite part, the method comprising:
dispensing a first set of lanes, that each comprise a tow of fiber-reinforced material, at a first angle such that the lanes are placed side-by-side with respect to each other, forming a first layer of a multi-lane tow;
applying a film directly in contact with and specifically atop the multi-lane tow;
operating a Pick-and-Place (PNP) machine to transport the multi-lane tow and the film together to a mandrel;
compacting the multi-lane tow over the mandrel via a Ply-By-Ply (PBP) machine disposed at the mandrel to form a layer of the preform; and
removing the film from the multi-lane tow after compacting the multi-lane tow via the Ply-By-Ply (PBP) machine.

14. An apparatus for preparing a preform for hardening into a composite part, the apparatus comprising:
multiple tape dispensing heads that each dispense a tow of fiber-reinforced material to form a multi-lane tow, the multiple dispensing heads configured to dispense a first set of lanes at a first angle such that the lanes are placed side-by-side with respect to each other, forming the first layer of the multi-lane tow;
a mandrel;
a Pick-and-Place (PNP) machine that transports the multi-lane tow and a film applied directly in contact with and specifically atop the multi-lane tow together to the mandrel, the Pick-and-Place (PnP) machine comprising an end effector that applies the film directly in contact with the multi-lane tow; and
a Ply-By-Ply (PBP) machine disposed at the mandrel that compacts the multi-lane tow onto a preform and removes the film from the multi-lane tow after compacting the multi-lane tow.

15. The apparatus of claim 14, further comprising:
a controller that directs the tape dispensing heads to dispense the first set of lanes.

16. The apparatus of claim 14, further comprising:
a shuttle onto which the multi-lane tow is laid-up by the multiple tape dispensing heads.

17. The apparatus of claim 14, further comprising:
a vacuum platen that applies suction to the multi-lane tow to hold the multi-lane tow in place before the multi-lane tow is transported.

18. The apparatus of claim 14, further comprising:
cutters that cut excess material from the multi-lane tow.

19. The apparatus of claim 14, wherein:
the PBP machine includes a veil that is pressed into the multi-lane tow by spreader arms to compact the multi-lane tow.

20. The apparatus of claim 14, wherein:
the film includes an engineered surface that contacts the multi-lane tow and adheres to the multi-lane tow during transport by the PNP machine, and an engineered surface that contacts the PBP machine during compaction.

\* \* \* \* \*